US011601938B2

(12) United States Patent
Yoon

(10) Patent No.: US 11,601,938 B2
(45) Date of Patent: Mar. 7, 2023

(54) METHOD AND APPARATUS FOR CONFIGURING DM-RS FOR V2X

(71) Applicant: Innovative Technology Lab Co., Ltd., Seoul (KR)

(72) Inventor: Sung Jun Yoon, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 0 days.

(21) Appl. No.: 17/666,454

(22) Filed: Feb. 7, 2022

(65) Prior Publication Data

US 2022/0167353 A1 May 26, 2022

Related U.S. Application Data

(63) Continuation of application No. 16/879,071, filed on May 20, 2020, now Pat. No. 11,284,392, which is a (Continued)

(30) Foreign Application Priority Data

Sep. 25, 2015 (KR) .................. 10-2015-0136017
May 13, 2016 (KR) .................. 10-2016-0058976
Aug. 12, 2016 (KR) .................. 10-2016-0103277

(51) Int. Cl.
*H04W 72/04* (2009.01)
*H04W 72/0446* (2023.01)
*H04L 5/00* (2006.01)

(52) U.S. Cl.
CPC ......... *H04W 72/0446* (2013.01); *H04L 5/005* (2013.01); *H04L 5/0012* (2013.01)

(58) Field of Classification Search
None
See application file for complete search history.

(56) References Cited

U.S. PATENT DOCUMENTS 9,800,381 B2   10/2017  Chen et al.
11,483,099 B2 * 10/2022  Park .................... H04W 72/042
(Continued)

FOREIGN PATENT DOCUMENTS

| EP | 2487853 A2 | 8/2012 |
|----|----|----|
| WO | 2015119478 A1 | 8/2015 |
| WO | 2015130067 | 9/2015 |

OTHER PUBLICATIONS

3rd Generation Partnership Project; Technical Specification Group Radio Access Network; Evolved Universal Terrestrial Radio Access (E-UTRA); Physical channels and modulation (Release 12); 3GPP TS 36.211 V12.6.0, Jun. 2015, pp. 1-136, 3GPP Organizational Partners.

(Continued)

*Primary Examiner* — Otis L Thompson, Jr.

(57) ABSTRACT

A method includes mapping, based on a first group-hopping associated with a first time resource, a first demodulation-reference signal (DM-RS) in a first symbol in the first time resource; mapping, based on a second group-hopping associated with the first time resource and with an offset, a second DM-RS in a second symbol in the first time resource; mapping, based on a third group-hopping associated with a second time resource, a third DM-RS in a third symbol in the second time resource; mapping, based on a fourth group-hopping associated with the second time resource and with an offset, a fourth DM-RS in a fourth symbol in the second time resource; and transmitting, to a second wireless user device, the first DM-RS, the second DM-RS, the third DM-RS, and the fourth DM-RS.

24 Claims, 6 Drawing Sheets

(a)

(b)

Related U.S. Application Data continuation of application No. 16/039,973, filed on Jul. 19, 2018, now Pat. No. 10,681,695, which is a continuation of application No. 15/275,169, filed on Sep. 23, 2016, now Pat. No. 10,057,900.

(56) References Cited

U.S. PATENT DOCUMENTS

| | | |
|---|---|---|
| 2010/0246527 A1 | 9/2010 | Montojo et al. |
| 2011/0228722 A1 | 9/2011 | Noh et al. |
| 2012/0140698 A1 | 6/2012 | Noh et al. |
| 2012/0140717 A1 | 6/2012 | Zhu et al. |
| 2012/0155338 A1 | 6/2012 | Noh et al. |
| 2012/0320872 A1 | 12/2012 | Yang et al. |
| 2013/0265955 A1 | 10/2013 | Kim et al. |
| 2013/0287064 A1 | 10/2013 | Seo et al. |
| 2013/0322363 A1 | 12/2013 | Chen et al. |
| 2014/0328329 A1 | 11/2014 | Novlan et al. |
| 2015/0098369 A1 | 4/2015 | Song et al. |
| 2015/0270939 A1 | 9/2015 | Ro et al. |
| 2015/0326362 A1 | 11/2015 | Xiong et al. |
| 2016/0285935 A1 | 9/2016 | Wu et al. |
| 2016/0295624 A1 | 10/2016 | Novlan et al. |
| 2016/0366658 A1 | 12/2016 | Chae |
| 2017/0019887 A1 | 1/2017 | Jiang et al. |
| 2017/0041103 A1 | 2/2017 | Maattanen et al. |
| 2017/0245251 A1 | 8/2017 | Kim et al. |
| 2017/0273128 A1 | 9/2017 | Abedini et al. |
| 2017/0373794 A1* | 12/2017 | Yi .................. H04L 1/0042 |
| 2018/0006864 A1* | 1/2018 | Hwang ............ H04L 27/2613 |
| 2018/0048446 A1 | 2/2018 | Jiang et al. |
| 2018/0255444 A1 | 9/2018 | Chae et al. |
| 2019/0029006 A1 | 1/2019 | Wang et al. |
| 2019/0090250 A1 | 3/2019 | Lee et al. |
| 2019/0191461 A1 | 6/2019 | Lee et al. |

OTHER PUBLICATIONS

International Search Report for International Patent Application No. PCT/KR2016/010716, dated Jan. 11, 2017.

Written Opinion for International Patent Application No. PCT/KR2016/010716, dated Jan. 11, 2017.

Extended European search report for European Patent Application No. 16 849 032.4, dated Jul. 4, 2019.

Huawei et al: "DMRS enhancement for V2V", 3GPP Draft; R1-153801, 3rd Generation Partnership Project (3GPP), Mobile Competence Centre; 650, Route des Lucioles; F-06921 Sophia-Antipolis Cedex; France vol. RAN WG1, No. Beijing, China; Aug. 24, 2015-Aug. 28, 2015 Aug. 23, 2015 (Aug. 23, 2015).

Huawei et al: "PUSCH for MTC and Coverage Enhancement", 3GPP Draft; R1-153759, 3rd Generation Partnership Project (3GPP), Mobile Competence Centre; 650, Route des Lucioles; F-06921 Sophia-Antipolis Cedex; France vol. RAN WG1, No. Beijing, China; Aug. 24, 2015-Aug. 28, 2015 Aug. 23, 2015 (Aug. 23, 2015).

European search report for EU Application No. 20189419.3 dated Nov. 9, 2020.

"Considerations on the LTE V2X Feasibility Study". R1-154434, Ericsson, 3GPP TSG RAN WG1 Meeting #82, Beijing, China, Aug. 24-28, 2015.

"Introduction of Rel-10 LTE-Advanced features in 36.211", R1-105096, Ericsson, 3GPP TSG-RAN Meeting #62, Madrid Spain, Aug. 23-27, 2010.

* cited by examiner (a) V2V OPERATION (b) V2I OPERATION (c) V2P OPERATION (a) V2V OPERATION (b) V2I OPERATION (c) V2P OPERATION (a)

METHOD AND APPARATUS FOR CONFIGURING DM-RS FOR V2X

CROSS-REFERENCE TO RELATED APPLICATIONS

This application is a continuation of U.S. patent application Ser. No. 16/879,071, filed on May 20, 2020, which is a continuation of U.S. patent application Ser. No. 16/039,973, filed on Jul. 19, 2018, which is a continuation of U.S. patent application Ser. No. 15/275,169, filed on Sep. 23, 2016, which claims priority from and the benefit of Korean Patent Application Nos. 10-2015-0136017, filed on Sep. 25, 2015, 10-2016-0058976, filed on May 13, 2016, and 10-2016-0103277, filed on Aug. 12, 2016, which are hereby incorporated by reference in its entirety.

BACKGROUND

1. Field

The present disclosure relates to a wireless communication system, and more particularly, to a method and apparatus for configuring a demodulation reference signal (DM-RS) for vehicle-to-X (V2X).

2. Discussion of the Background

Vehicle-to-everything (V2X, Vehicle-to-X) communication refers to a communication scheme that exchanges or shares information associated with traffic conditions through communication with roadway infrastructures and other vehicles during driving. V2X may include vehicle-to-vehicle (V2V) indicating communication between vehicles, vehicle-to-pedestrian (V2P) indicating communication between terminals carried by a vehicle and a person, and vehicle-to-infrastructure/network (V2I/N) indicating communication between a roadside unit (RSU) and a network. In this instance, the road side unit (RSU) may be a base station or a transportation infrastructure entity embodied by a fixed terminal. For example, it may be an entity that transmits a speed notification to a vehicle.

V2X communication may be embodied based on a device-to-device (D2D) communication scheme. For example, control information, such as, scheduling assignment (SA) needs to be transmitted/received for V2X communication, and data may be transmitted/received based on the control information. Also, using a demodulation reference signal (DM-RS) is under discussion so that a side that receives an SA and/or data accurately estimates a channel and demodulates the SA and/or data based on the estimated channel. However, a method of generating a DM-RS sequence, which prevents an increase in DM-RS overhead in a subframe, and minimizes interference between neighbor terminals, has not been provided.

SUMMARY

Exemplary embodiments provide an apparatus and a method for configuring a demodulation reference signal (DM-RS) for vehicle-to-X (V2X).

One or more exemplary embodiments provide a method for transmitting Demodulation-Reference Signal (DM-RS) configured for Vehicle-to-everything (V2X) communication. The method includes generating a first DM-RS for V2X communication and a second DM-RS for V2X communication, the first DM-RS for V2X communication being mapped in a first symbol in a first slot of a subframe, the second DM-RS for V2X communication being mapped in a second symbol in the first slot of the subframe; generating a third DM-RS for V2X communication and a fourth DM-RS for V2X communication, the third DM-RS for V2X communication being mapped in a first symbol in a second slot of the subframe, the fourth DM-RS for V2X communication being mapped in a second symbol in the second slot of the subframe; and transmitting the first DM-RS for V2X communication, the second DM-RS for V2X communication, the third DM-RS for V2X communication, and the fourth DM-RS for V2X communication. The first DM-RS for V2X communication is generated based on a first group-hopping, and the second DM-RS for V2X communication is generated based on a second group-hopping.

One or more exemplary embodiments provide a method for transmitting Demodulation-Reference Signal (DM-RS) for Vehicle-to-everything (V2X) communication. The method includes generating a first DM-RS for V2X communication and a second DM-RS for V2X communication, the first DM-RS for V2X communication being mapped in a first symbol in a first slot of a subframe, the second DM-RS for V2X communication being mapped in a second symbol in the first slot of the subframe; generating a third DM-RS for V2X communication and a fourth DM-RS for V2X communication, the third DM-RS for V2X communication being mapped in a first symbol in a second slot of the subframe, the fourth DM-RS for V2X communication being mapped in a second symbol in the second slot of the subframe; and transmitting the first DM-RS for V2X communication, the second DM-RS for V2X communication, the third DM-RS for V2X communication, and the fourth DM-RS for V2X communication. Each of the first slot and the second slot consists of seven symbols, respectively. The first slot precedes the second slot in a time axis. The first symbol in the first slot is symbol #2 and the second symbol in the first slot is symbol #5 if the seven symbols in the first slot are arranged from symbol #0 to symbol #6, and the first symbol in the second slot is symbol #1 and the second symbol in the second slot is symbol #4 if the seven symbols in the second slot are arranged from symbol #0 to symbol #6.

One or more exemplary embodiments provide a method for transmitting Demodulation-Reference Signal (DM-RS) configured for Vehicle-to-everything (V2X) communication. The method includes generating a first DM-RS for V2X communication and a second DM-RS for V2X communication, the first DM-RS for V2X communication being mapped in a first symbol in a first slot of a subframe, the second DM-RS for V2X communication being mapped in a second symbol in the first slot of the subframe; generating a third DM-RS for V2X communication and a fourth DM-RS for V2X communication, the third DM-RS for V2X communication being mapped in a first symbol in a second slot of the subframe, the fourth DM-RS for V2X communication being mapped in a second symbol in the second slot of the subframe; applying first orthogonal sequence [+1 +1 +1 +1] or second orthogonal sequence [+1 −1 +1 −1] in association with the first, second, third, and fourth DM-RSs for V2X communication; and transmitting the first DM-RS for V2X communication, the second DM-RS for V2X communication, the third DM-RS for V2X communication, and the fourth DM-RS for V2X communication.

BRIEF DESCRIPTION OF THE DRAWINGS

FIG. 4 illustrates an example of an uplink (UL) DM-RS in a UL channel and a DM-RS in a sidelink (SL) channel for D2D (or ProSe).

FIG. 5 illustrates an example of a DM-RS in a channel for PC5 link-based V2X that complies with D2D (or ProSe) of the present disclosure.

DETAILED DESCRIPTION OF THE ILLUSTRATED EMBODIMENTS

Figure 1:
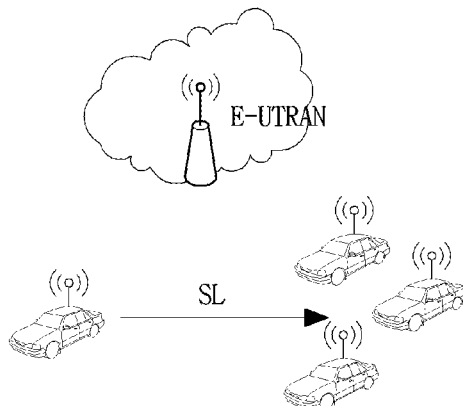
FIG. 1, FIG. 2, and FIG. 3 are diagrams illustrating a V2X scenario associated with the present disclosure.
Figure 1:
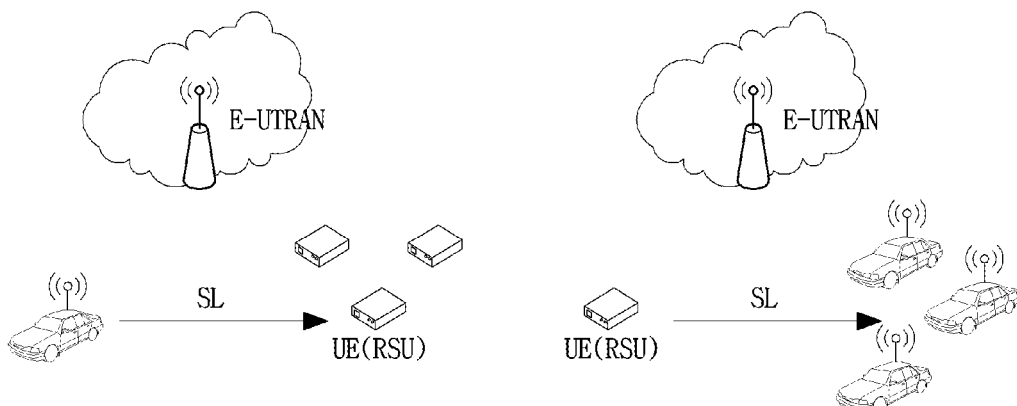
Figure 1:
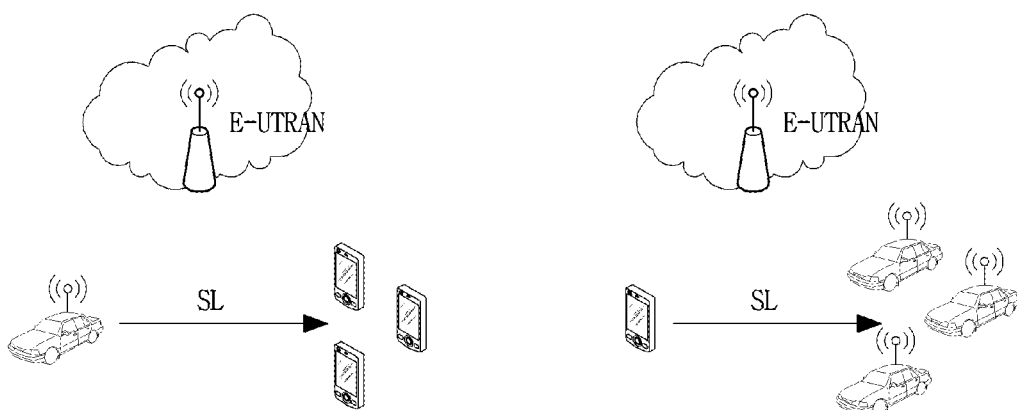

Exemplary embodiments of the present invention will be described more fully hereinafter with reference to the accompanying drawings, in which exemplary embodiments of the invention are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

That is, it is apparent that various operations, which are performed for communicating with a terminal in a network formed of a plurality of network nodes including a base station (BS), are executable by the BS or other network nodes excluding the BS. The 'BS' may be replaced with the terms, such as, a fixed station, a Node B, an eNode B (eNB), an access point (AP), and the like. Also, the 'terminal' may be replaced with the terms, such as a User Equipment (UE), a Mobile Station (MS), a Mobile Subscriber Station (MSS), a Subscriber Station (SS), a non-AP station (non-AP STA), and the like.

The terms used as abbreviations in the present disclosure are defined as follows.

D2D: Device to Device (communication)
ProSe: (Device to Device) Proximity Services
SL: Sidelink
SCI: Sidelink Control Information
PSSCH: Physical Sidelink Shared Channel
PSBCH: Physical Sidelink Broadcast Channel
PSCCH: Physical Sidelink Control Channel
PSDCH: Physical Sidelink Discovery Channel
SLSS: Sidelink Synchronization Signal (=D2DSS (D2D Synchronization Signal))
SA: Scheduling assignment
DM-RS: DeModulation Reference Signal
PSSID: Physical-layer Sidelink Synchronization Identity
nSAID: Sidelink group destination identity
nSLID: Physical layer sidelink synchronization identity
PUSCH: Physical Uplink Shared Channel Also, various operation modes may be defined based on a resource allocation scheme for a direct link (e.g., D2D, ProSe, or SL communication). When data and control information for a direct link (e.g., D2D, ProSe, or SL communication) are indicated as direct data and direct control information, respectively, mode 1 indicates an operation mode in which a base station (or a relay station) accurately schedules a resource that a terminal uses to transmit direct data and direct control information, and mode 2 indicates an operation mode in which a terminal autonomously selects a resource from a resource pool to transmit direct data and direct control information.

Hereinafter, although embodiments of the present disclosure are described by using V2X communication as an example, the scope of the present disclosure may not be limited to V2X communication. Further, the embodiments of the present disclosure may be applied to direct link based communication, such as D2D, ProSe, SL communication, or the like.

V2X is a term that generally indicates V2V, V2P, and V2I/N, and each of V2V, V2P, and V2I/N may be defined as shown in Table 1, in association with LTE communication.

TABLE 1

| | |
|---|---|
| V2V | covering LTE-based communication between vehicles |
| V2P | covering LTE-based communication between a vehicle and a device carried by an individual (e.g. handheld terminal carried by a pedestrian, cyclist, driver or passenger) |
| V2I/N | covering LTE-based communication between a vehicle and a roadside unit/network<br>A roadside unit (RSU) is a stationary infrastructure entity supporting V2X applications that can exchange messages with other entities supporting V2X applications.<br>Note: RSU is a term frequently used in existing ITS specifications, and the reason for introducing the term in the 3GPP specifications is to make the documents easier to read for the ITS industry. RSU is a logical entity that combines V2X application logic with the functionality of an eNB (referred to as eNB-type RSU) or UE (referred to as UE-type RSU). |

Figure 2:
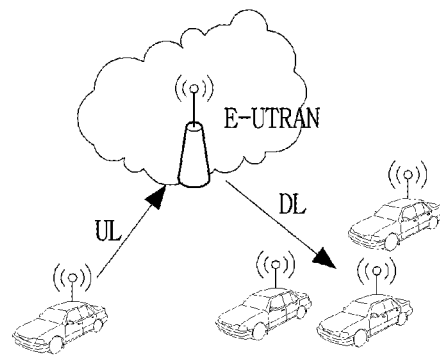
Figure 2:
Figure 2:
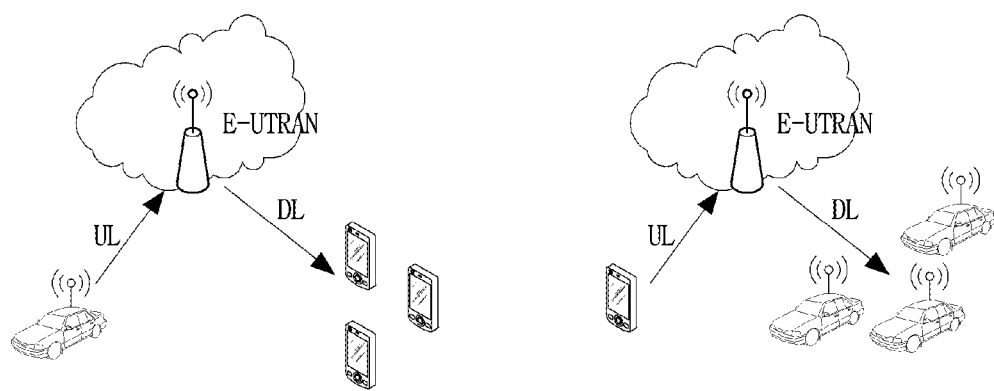
Figure 3:
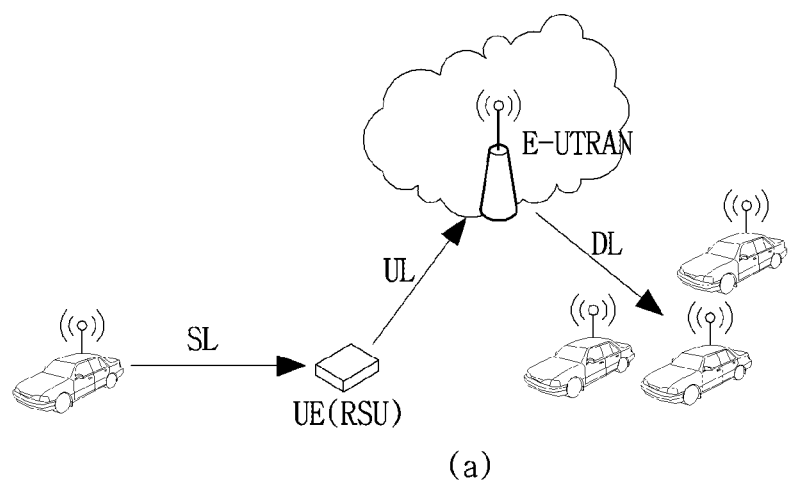
Figure 3:
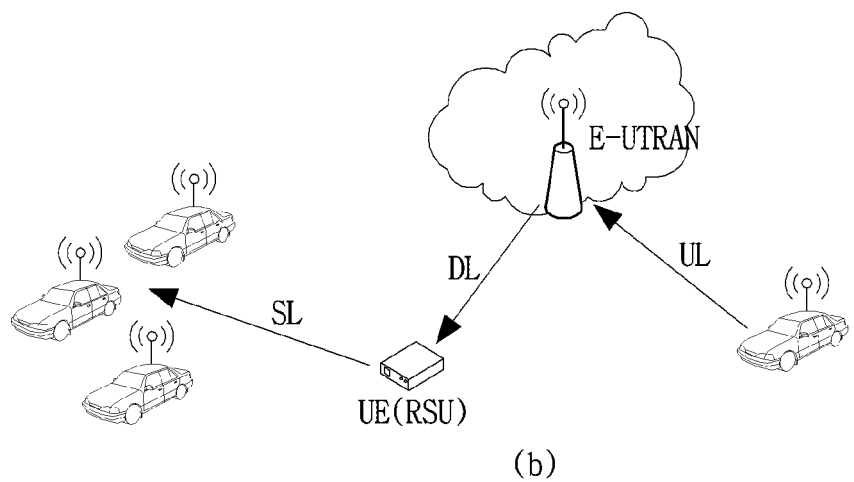

For a V2V operation based on PC5 which is a D2D communication link (that is, a direct interface between two devices that support ProSe) out of V2X, various scenarios such as Table 2, Table 3, and Table 4 are considered with reference to FIGS. 1, 2, and 3.

FIG. 1, FIG. 2, and FIG. 3 are diagrams illustrating a V2X scenario associated with the present disclosure.

Table 2 and FIG. 1 illustrate a scenario that supports a V2X operation that is based on only a PC5 interface. Part (a) of FIG. 1 illustrates a V2V operation, part (b) of FIG. 1 illustrates a V2I operation, and part (c) of FIG. 1 illustrates a V2P operation.

TABLE 2

This scenario supports V2X operation only based on PC5.
In this scenario, a UE transmits a V2X message to multiple UEs at a local area in sidelink.
For V2I, either transmitter UE or receiver UE(s) are UE-type RSU.
For V2P, either transmitter UE or receiver UE(s) are pedestrian UE.

Table 3 and FIG. 2 illustrate a scenario that supports a V2X operation that is based on only a Uu interface (that is, an interface between a UE and an eNB). Part (a) of FIG. 2 illustrates a V2V operation, part (b) of FIG. 2 illustrates a V2I operation, and part (c) of FIG. 2 illustrates a V2P operation.

TABLE 3

This scenario supports V2X operation only based on Uu.
In this scenario,
For V2V and V2P, a UE transmits a V2X message to E-UTRAN in uplink and E-UTRAN transmits it to multiple UEs at a local area in downlink.
For V2I, when receiver is eNB type RSU, a UE transmits a V2I message to E-UTRAN(eNB type RSU) in uplink; when transmitter is eNB type

TABLE 3-continued

RSU, E-UTRAN(eNB type RSU) transmits a I2V message to multiple UEs at a local area in downlink.
For V2P, either transmitter UE or receiver UE(s) are pedestrian UE.
To support this scenario, E-UTRAN performs uplink reception and downlink transmission of V2X messages. For downlink, E-UTRAN may use a broadcast mechanism.

Table 4 and FIG. 3 illustrate a scenario that supports a V2X operation that uses both a Uu interface and a PC5 interface. Part (a) of FIG. 3 illustrates scenario 3A of Table 4 and part (b) of FIG. 3 illustrates scenario 3B of Table 4.

TABLE 4

This scenario supports V2V operation using both Uu and PC5.

| | |
|---|---|
| Scenario 3A | In this scenario, a UE transmits a V2X message to other UEs in sidelink. One of the receiving UEs is a UE type RSU which receives the V2X message in sidelink and transmits it to E-UTRAN in uplink. E-UTRAN receives the V2X message from the UE type RSU and then transmits it to multiple UEs at a local area in downlink. To support this scenario, E-UTRAN performs uplink reception and downlink transmission of V2X messages. For downlink, E-UTRAN may use a broadcast mechanism. |
| Scenario 3B | In this scenario, a UE transmits a V2X message to E-UTRAN in uplink and E-UTRAN transmits it to one or more UE type RSUs. Then, the UE type RSU transmits the V2X message to other UEs in sidelink. To support this scenario, E-UTRAN performs uplink reception and downlink transmission of V2X messages. For downlink, E-UTRAN may use a broadcast mechanism. |

Hereinafter, a UL DM-RS for a UL PUSCH will be described.

Basic information associated with a UL DM-RS in a UL PUSCH is described in the Example below and Tables 5A and 5B, provided below.

Example

The PUSCH demodulation reference signal sequence $\gamma_{PUSCH}^{(\lambda)}(\cdot)$ associated with layer $\lambda \in \{0, 1, \ldots, v-1\}$ is defined by $$\gamma_{PUSCH}^{(\lambda)}(m \cdot M_{sc}^{RS}+n) = w^{(\lambda)}(m) \gamma_{u,v}^{(\alpha_\lambda)}(n)$$

Where $m = 0, 1$ $n = 0, \ldots, M_{sc}^{RS}-1$ and $M_{sc}^{RS} = M_{sc}^{PUSCH}$ Subclause of "Generation of the reference signal sequence" defines the sequence $\gamma_{u,v}^{(\alpha_\lambda)}(0), \ldots, \gamma_{u,v}^{(\alpha_\lambda)}(M_{sc}^{RS}-1)$. The orthogonal sequence $w^{(\lambda)}(m)$ is given by $[w^{(\lambda)}(0)\ w^{(\lambda)}(1)] = [1\ 1]$ for DCI format 0 if the higher-layer parameter Activate-DMR-with OCC is not set or if the temporary C-RNTI was used to transmit the most recent uplink-related DCI for the transport block associated with the corresponding PUSCH transmission, otherwise it I given by Table 5A using the cyclic shift field in most recent uplink-related DCI for the transport block associated with the corresponding PUSCH transmission.

The cyclic shift $\alpha_\lambda$ is a slot $n_s$ is given as $\alpha_\lambda = 2\pi n_{sc,\lambda}/12$ with $n_{cs,\lambda} = (n_{DMRS}^{(1)} + n_{DMRS,\lambda}^{(2)} + n_{PN}(n_s)) \bmod 12$ Where the value of $n_{DMRS}^{(1)}$ is given by Table 5B according to the parameter cyclicShift provided by higher layer, $n_{DMRS,\lambda}^{(2)}$ is given by the cyclic shift for DMRS field in most recent uplink-related DCI for the transport block associated with the corresponding PUSCH transmission where the value of $n_{DMRS,\lambda}^{(2)}$ is given in Table 5A.

The first row of Table 5A shall be used to obtain $n_{DMRS,0}^{(2)}$ and $w^{(\lambda)}(m)$ if there is no uplink-related DCI for the same transport block associated with the corresponding PUSCH transmission, and

- if the initial PUSCH for the same transport block is semi-persistently scheduled, or
- if the initial PUSCH for the same transport block is scheduled by the random access response grant.

The quantity $n_{PN(n_s)}$ is given by $$n_{PN(n_s)} = \sum_{i=0}^{7} c(8 N_{symb}^{UL} \cdot n_s + i) \cdot 2^i$$

where the pseudo-random sequence $c^{(i)}$ is defined by clause 7.2. The application of $c^{(i)}$ is cell-specific. The pseudo-random sequence generator shall be initialized with $c_{init}$ at the beginning of each radio frame. The quantity $c_{init}$ is given by $$c_{init} = \left\lfloor \frac{N_{ID}^{cell}}{30} \right\rfloor \cdot 2^5 + ((N_{ID}^{cell} + \Delta_{ss}) \bmod 30)$$

if no value for $N_{ID}^{csh\_DMRS}$ is configured by higher layers or the PUSCH transmission corresponds to a Random Access Response Grant or a retransmission of the same transport block as part of the contention based random access procedure, otherwise it is given by $$c_{init} = \left\lfloor \frac{N_{ID}^{csh\_DMRS}}{30} \right\rfloor \cdot 2^5 + \left(N_{ID}^{csh\_DMRS} \bmod 30\right).$$

The vector of reference signals shall be precoded according to $$\begin{bmatrix} \tilde{\gamma}_{PUSCH}^{(0)} \\ \vdots \\ \tilde{\gamma}_{PUSCH}^{(P-1)} \end{bmatrix} = W \begin{bmatrix} \gamma_{PUSCH}^{(0)} \\ \vdots \\ \gamma_{PUSCH}^{(v-1)} \end{bmatrix}$$

where P is the number of antenna ports used for PUSCH transmission.

For PUSCH transmission using a single antenna port, P=1, W=1 and v=1.

For spatial multiplexing, P=2 or P=4 and the precoding matrix W shall be identical to the precoding matrix used in clause 5.3.3A.2 for precoding of the PUSCH in the same subframe.

TABLE 5A

Mapping of Cyclic Shift Field in uplink-related DCI format to $n_{DMRS,\lambda}^{(2)}$ and $[w^{(\lambda)}(0)\ w^{(\lambda)}(1)]$

| Cyclic Shift Field in uplink-related DCI format [3] | $n_{DMRS,\lambda}^{(2)}$ | | | | $[w^{(\lambda)}(0)\ w^{(\lambda)}(1)]$ | | | |
|---|---|---|---|---|---|---|---|---|
| | λ = 0 | λ = 1 | λ = 2 | λ = 3 | λ = 0 | λ = 1 | λ = 2 | λ = 3 |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 1] | [1 1] |

TABLE 5B

Mapping of cyclicShift to $n_{DMRS}^{(1)}$ values

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

Hereinafter, a DM-RS (hereinafter, an SL DM-RS) for an SL PSSCH/PSCCH/PSDCH/PSBCH will be described.

Basic information associated with an SL DM-RS for D2D (or ProSe) is as follows. Unlike the UL DM-RS for the UL PUSCH which has been described with reference to Table 5, the definitions of predetermined parameters and applied equations may be changed for the SL DM-RS as shown in Table 6 and Table 7.

TABLE 6

| Parameter | | PSSCH | PSCCH |
|---|---|---|---|
| Group hopping | | enabled | disabled |
| | $n_{ID}^{RS}$ | $n_{ID}^{SA}$ | — |
| | $n_s$ | $n_{ss}^{PSSCH}$ | — |
| | $f_{ss}$ | $n_{ID}^{SA}$ mod30 | 0 |
| Sequence hopping | | disabled | disabled |
| Cyclic shift | $n_{cs,\lambda}$ | $\lfloor n_{ID}^{SA}/2 \rfloor$ md8 | 0 |
| Orthogonal sequence | $[w^{\lambda}(0)\ w^{\lambda}(1)]$ | [+1 +1] if $n_{ID}^{SA}$ mod 2 = 0 [+1 −1] if $n_{ID}^{SA}$ mod 2 = 1 | [+1 +1] |
| Reference signal length | $M_{sc}^{RS}$ | $M_{sc}^{PSSCH}$ | $M_{sc}^{PSSCH}$ |
| Number of layers | v | 1 | 1 |
| Number of antenna ports | P | 1 | 1 |

TABLE 7

| Parameter | | PSDCH | PSBCH |
|---|---|---|---|
| Group hopping | | disabled | disabled |
| | $f_{ss}$ | 0 | $\lfloor N_{ID}^{SL}/16 \rfloor$ mod30 |
| Sequence hopping | | disabled | disabled |
| Cyclic shift | $n_{cs,\lambda}$ | 0 | $\lfloor N_{ID}^{SL}/2 \rfloor$ mod8 |
| Orthogonal sequence | $[w^{\lambda}(0)\ w^{\lambda}(1)]$ | [+1 +1] | [+1 +1] if $N_{ID}^{SL}$ mod2 = 0 [+1 +1] if $N_{ID}^{SL}$ mod2 = 1 |
| Reference signal length | $M_{sc}^{RS}$ | $M_{sc}^{PSDCH}$ | $M_{sc}^{PSBCH}$ |
| Number of layers | v | 1 | 1 |
| Number of antenna ports | P | 1 | 1 |

Hereinafter, embodiments of the present disclosure will be described in detail.

Figure 4:
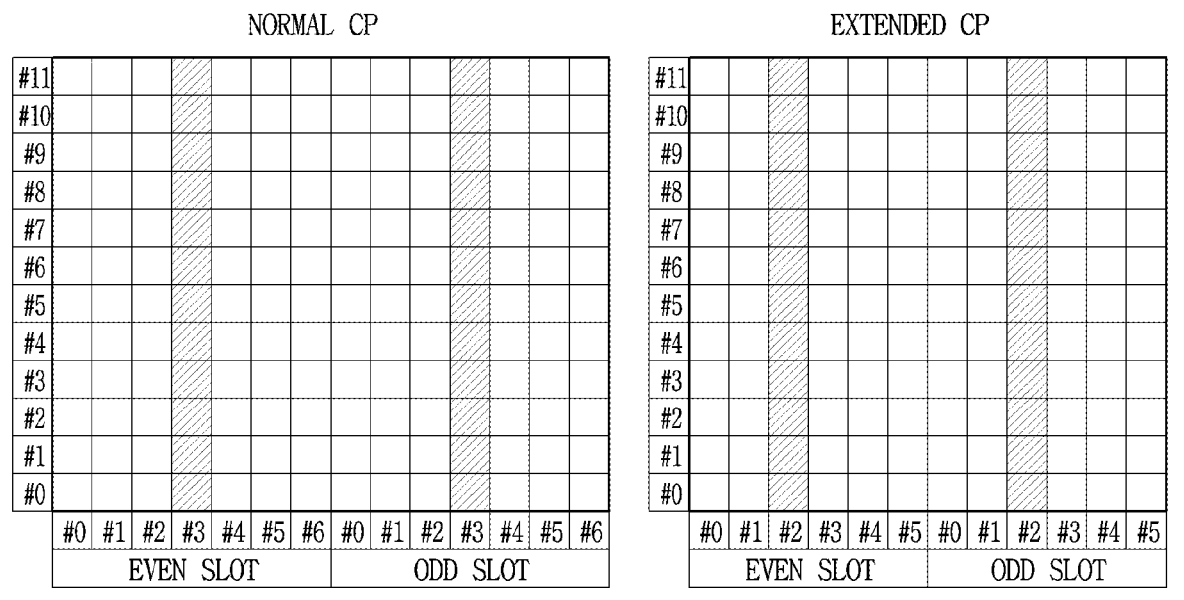

In the case of a UL DM-RS in a UL PUSCH and a DM-RS in a slidelink (SL) PSSCH/PSCCH/PSDCH/PSBCH for LTE-based D2D (ProSe), a DM-RS is generated by mapping a DM-RS sequence to a single symbol for each slot as shown in FIG. 4 and the DM-RS is transmitted. That is, a single subframe includes two slots (that is, a slot having an even number index (that is, an even slot)) and a slot having an odd number index (that is, an odd slot)), and a single slot may include 6 or 7 symbols based on the length of a cyclic prefix (CP). For example, in the case of a normal CP, 7 symbols (that is, symbol indices #0, #1, . . . , #6) are included in a single slot, and a DM-RS may be mapped to a fourth symbol (that is, a symbol index #3) out of the symbols. In the case of an extended CP, 6 symbols (that is, symbol indices #0, #1, . . . , #5) are included in a single slot, and a DM-RS may be mapped to a third symbol (that is, a symbol index #2) out of the symbols.

Figure 5:
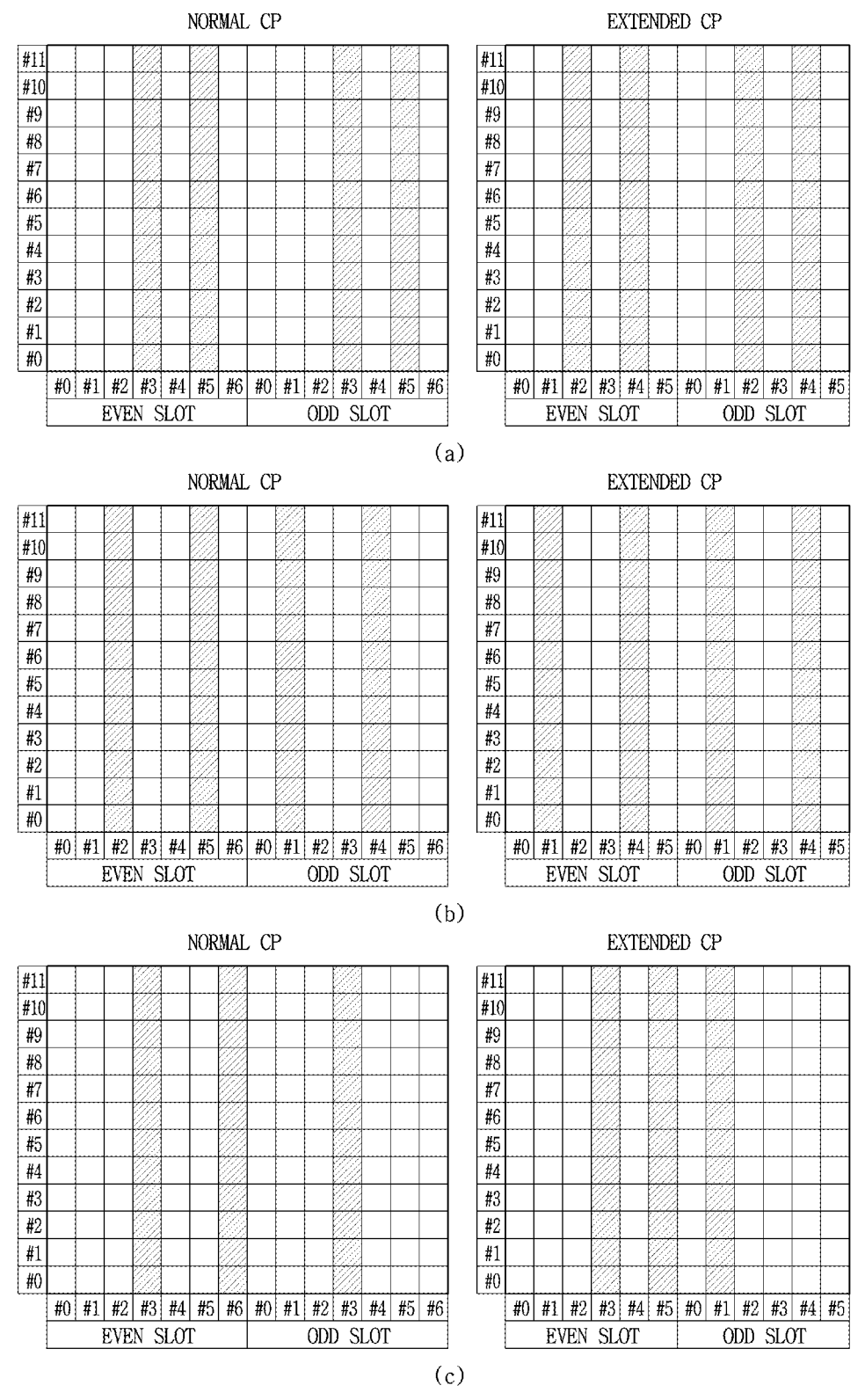

However, in the case of V2X, a DM-RS may be mapped using a larger number of symbols, when compared to the example of FIG. 4, in a single subframe as shown in FIG. 5, by taking into consideration high Doppler effect.

In a V2X communication, relatively higher Doppler effect may occur due to the moving speed of the vehicle performing the V2X communication. In order to address such a problem, more symbols may be used to map DM-RS for a V2X communication in a subframe. Further, if the same sequence generation method for V2X DM-RS is used as utilized in LTE PUSCH DM-RS or D2D DM-RS generations, e.g., using the same group-hopping, cyclic shift, and orthogonal sequence, interference among DM-RSs for V2X transmitted from various devices may increase. The increased symbols in a subframe for DM-RS mapping may also exacerbate the interference problem.

One or more exemplary embodiments illustrated herein address the problems by utilizing more efficient group-hopping, cyclic shift selection, and orthogonal sequence selection for V2X DM-RS generations. One or more exemplary embodiments also reduces the possible interferences among DM-RSs for V2X communication transmitted from various devices, and improves the communication quality in channel measurements for demodulating control information and data through DM-RSs for V2X communication.

Part (a) of FIG. 5 illustrates that a DM-RS is transmitted through a fourth symbol (symbol #3) and a sixth symbol (symbol #5) of each slot, in the case of the normal CP. However, this is merely an example, and two symbols randomly selected out of a total of 7 symbols included in a single slot may be determined as symbols through which a DM-RS is transmitted. For example, one of the two symbols through which a DM-RS is transmitted in each slot is a fourth symbol (symbol #3) of each slot, and the other symbol may be one of a first symbol (symbol #0), a second symbol (symbol #1), a third symbol (symbol #2), a fifth symbol (symbol #4), a sixth symbol (symbol #5), and a seventh symbol (symbol #6).

In the same manner, the part (a) of FIG. 5 illustrates that a DM-RS is transmitted through a third symbol (symbol #2) and a fifth symbol (symbol #4) of each slot, in the case of the extended CP. However, this is merely an example, and two symbols randomly selected out of a total of 6 symbols included in a single slot may be determined as symbols through which a DM-RS is transmitted. For example, one of the two symbols through which a DM-RS is transmitted in each slot is a third symbol (symbol #2) of each slot, and the other symbol may be one of a first symbol (symbol #0), a second symbol (symbol #1), a fourth symbol (symbol #3), and a fifth symbol (symbol #4), a sixth symbol (symbol #5).

In part (b) of FIG. 5, in the case of the normal CP, two symbols out of seven symbols in each of a first slot and a second slot may be determined as symbols through which a DM-RS is transmitted. For example, as illustrated in the part (b) of FIG. 5, two symbols through which a DM-RS is transmitted out of seven symbols in the first slot may be a third symbol (symbol #2) and a sixth symbol (symbol #5). Two symbols through which a DM-RS is transmitted out of seven symbols in the second slot may be a second symbol (symbol #1) and a fifth symbol (symbol #4).

In the same manner, in FIG. the part (b) of 5, in the case of the extended CP, two symbols out of six symbols in each of a first slot and a second slot may be determined as symbols through which a DM-RS is transmitted. For example, as illustrated in the part (b) of FIG. 5, two symbols through which a DM-RS is transmitted out of six symbols in the first slot may be a second symbol (symbol #1) and a fifth symbol (symbol #4). Two symbols through which a DM-RS is transmitted out of six symbols in the second slot may be a second symbol (symbol #1) and a fifth symbol (symbol #4).

In part (c) of FIG. 5, in the case of the normal CP, three symbols out of 14 symbols in a single subframe that includes a first slot and a second slot may be determined as symbols through which a DM-RS is transmitted. For example, as illustrated in the part (c) of FIG. 5, three symbols through which a DM-RS is transmitted out of 14 symbols included in the single subframe may be a fourth symbol (symbol #3) and a seventh symbol (symbol #6) in the first slot, and a fourth symbol (symbol #3) in the second slot.

In the same manner, in the part (c) of FIG. 5, in the case of the extended CP, three symbols out of 12 symbols in a single subframe that includes a first slot and a second slot may be determined as symbols through which a DM-RS is transmitted. For example, as illustrated in the part (c) of FIG. 5, three symbols through which a DM-RS is transmitted out of 12 symbols included in the single subframe may be a fourth symbol (symbol #3) and a sixth symbol (symbol #5) in the first slot, and a second symbol (symbol #1) in the second slot.

In this instance, to minimize interference from neighbor terminals, an effective group hopping method, a cyclic shift method, an orthogonal cover code (OCC) or orthogonal sequence mapping method, or the like need to be considered when a DM-RS is generated.

Hereinafter, group hopping for the present disclosure will be described.

In the case of D2D (ProSe), group hopping may be applied for each slot when a DM-RS that links with a PSSCH and a PSCCH is transmitted, as shown in Equation 1 below.

$$f_{gh}(n_s) = \begin{cases} 0 & \text{if group hopping is disabled} \\ (\sum_{i=0}^{7} c(8n_s + i) \cdot 2^i) \bmod 30 & \text{if group hopping is enabled} \end{cases}$$ [Equation 1]

In Equation 1, $n_s$ denotes a slot index. Also, $c(i)$ denotes a pseudo-random sequence that is defined as Gold sequence having a degree of 31, and a pseudo-random sequence generator for the pseudo-random sequence is initialized to $$c_{init} = \left\lfloor \frac{n_{ID}^{SA}}{30} \right\rfloor$$

at the beginning of each radio frame. Here, $n^{RS}_{ID}$ may be $N^{cell}_{ID}$ which is a physical cell ID (PCID), or $n^{PUCCH}_{ID}$ or $n^{PUSCH}_{ID}$ which is a parameter indicated by an RRC or a higher layer signaling.

Group hopping of Equation 1 is appropriate for the case in which a DM-RS is transmitted through a single symbol for each slot. However, by taking into consideration the case in which a DM-RS is transmitted through a plurality of symbols of each slot in V2X, there is a desire for a more effective group hopping method, and the present disclosure proposes the following method.

Hereinafter, method 1 will be defined for new group hopping according to the present disclosure.

According to method 1, as shown in Equation 2 below, by taking into consideration the case in which a DM-RS is generated in two symbols in a single slot which corresponds to the example of the part (a) of FIG. 5 or the part (b) of FIG. 5, two different group hopping patterns are defined in each slot, irrespective of the locations of the two symbols. One group hopping pattern is applied to a first symbol through which a DM-RS is transmitted in the slot, and the other group hopping pattern is applied to a second symbol through which the DM-RS is transmitted in the slot. In this instance, l'=0 or 1.

$$f_{gh} = \begin{cases} 0 & \text{if group hopping is disabled} \\ (\sum_{i=0}^{7} c(16n_{ss}^{PSSCH} + 8l' + i) \cdot 2^i) \bmod 30 & \text{if group hopping is enabled} \end{cases}$$ [Equation 2]

Here, $c(i)$ denotes a pseudo-random sequence that is defined as Gold sequence having a degree of 31, and a pseudo-random sequence generator for the pseudo-random sequence is initialized to $$c_{init} = \left\lfloor \frac{n_{ID}^{SA}}{30} \right\rfloor$$

at the beginning of each slot that satisfies $n^{PSSCH}_{ss}=0$. In this instance, $n^{PSSCH}_{ss}$ denotes a current slot number in the subframe pool for a sidelink. Here, $n^{SA}_{ID}$ may be a sidelink group destination identity.

Hereinafter, method 2 will be defined for new group hopping according to the present disclosure.

According to method 2, as shown in Equation 3 below, by taking into consideration the case in which a DM-RS is generated in three symbols in a single subframe which corresponds to the part (c) of FIG. 5, three different group hopping patterns are defined in each subframe, irrespective of the locations of the three symbols. A first group hopping pattern is applied to a first symbol through which a DM-RS is transmitted in the subframe, a second group hopping pattern is applied to a second symbol through which the DM-RS is transmitted in the subframe, and a third group hopping pattern is applied to a third symbol through which the DM-RS is transmitted in the subframe. In this instance, l'=0, 1, or 2.

$$f_{gh} = \begin{cases} 0 & \text{if group hopping is disabled} \\ \left(\sum_{i=0}^{7} c(8l' + i) \cdot 2^i\right) \bmod 30 & \text{if group hopping is enabled} \end{cases}$$ [Equation 3]

Here, c(i) denotes a pseudo-random sequence that is defined as Gold sequence having a degree of 31, and a pseudo-random sequence generator for the pseudo-random sequence is initialized to $$c_{init} = \left\lfloor \frac{N_{ID}^{SL}}{30} \right\rfloor \text{ or } c_{init} = \left\lfloor \frac{\lfloor N_{ID}^{SL}/24 \rfloor}{30} \right\rfloor$$

at the beginning of each PSBCH subframe (a subframe that transmits a PSBCH). Here, $N^{SL}_{ID}$ may be a physical layer sidelink synchronization identity.

Hereinafter, method 3 will be defined for new group hopping according to the present disclosure.

Method 3 defines a different group hopping pattern for each of the symbols in a single slot, and a corresponding symbol through which a DM-RS is transmitted applies a corresponding group hopping pattern of the symbol, as shown in Equation 4 below. This is applied to all of the cases illustrated through FIGS. 5A, 5B, and 5C. In this instance, $N^{SL}_{symb}$ denotes the number of symbols in a single slot in a sidelink (SL) (7 in the case of a normal CP, and 6 in the case of an extended CP), and l=0, 1, . . . , $N^{SL}_{symb}$ denotes a symbol index in a single slot.

$$f_{gh} = \begin{cases} 0 & \text{if group hopping is disabled} \\ \left(\sum_{i=0}^{7} c(8 \cdot N^{SL}_{symb} \cdot n_s + 8l + i) \cdot 2^i\right) \bmod 30 & \text{if group hopping is enabled} \end{cases}$$ [Equation 4]

In Equation 4, $n_s$ is $n^{PSSCH}_{ss}$ when the equation is applied to a DM-RS for a PSSCH.

In Equation 4, $n_s$ may have two types of values, that is, 0 or 1, when the equation is applied to a DM-RS for a PSBCH.

Also, c(i) denotes a pseudo-random sequence defined as Gold sequence having a degree of 31.

When Equation 4 is applied to the DM-RS for the PSSCH, the pseudo-random sequence generator for the pseudo-random sequence may be initialized to $$c_{init} = \left\lfloor \frac{n_{ID}^{SA}}{30} \right\rfloor$$

at the beginning of each slot that satisfies $n^{PSSCH}_{ss}$=0.

When Equation 4 is applied to the DM-RS for the PSCBCH, the pseudo-random sequence generator for the pseudo-random sequence may be initialized to $$c_{init} = \left\lfloor \frac{N_{ID}^{SL}}{30} \right\rfloor \text{ or } c_{init} = \left\lfloor \frac{\lfloor N_{ID}^{SL}/24 \rfloor}{30} \right\rfloor$$

at the beginning of every PSBCH subframe (a subframe that transmits a PSBCH).

In this instance, $n^{PSSCH}_{ss}$ denotes a current slot number in the subframe pool for a sidelink. Here, $n^{SA}_{ID}$ is a sidelink group destination identity, and $N^{SL}_{ID}$ is a physical layer sidelink synchronization identity.

Method 1 and method 2 for new group hopping according to the present disclosure for V2X define group hopping by taking into consideration only a symbol to which a DM-RS is mapped, in the same manner as LTE PUSCH-based D2D (ProSe).

Method 3 for new group hopping according to the present disclosure for V2X applies group hopping for each symbol, and a symbol to which a DM-RS is mapped applies a predetermined group hopping of the corresponding symbol.

When method 3 for new group hopping according to the present disclosure is applied, group hopping for a symbol to which a DM-RS is mapped in the LTE PUSCH based-D2D (ProSe) and group hopping for a symbol to which a DM-RS is mapped in V2X are set to be different from each other, and thus, interference may be reduced that may occur between the DM-RS in D2D (ProSe) and the DM-RS in V2X, which may be transmitted in parallel in the same symbol having the same $c_{init}$ (e.g., $n^{SA}_{ID}$ is different from each other but $$c_{init} = \left\lfloor \frac{n_{ID}^{SA}}{30} \right\rfloor$$

is identical to each other), which is an advantage.

For example, in a symbol to which a DM-RS is mapped in a first slot in the LTE PUSCH-based D2D (ProSe), group hopping is determined based on a pseudo-random sequence value of c(0) to c(7). In this instance, when method 1 and method 2 for new group hopping according to the present disclosure for V2X are applied, group hopping may be determined based on a pseudo-random sequence value of c(0) to c(7) in a first symbol of a first slot to which a DM-RS is mapped (herein, this symbol may be a symbol located in the same location of a symbol to which a DM-RS is mapped in a first slot in the LTE PUSCH-based D2D (ProSe)). However, when method 3 for new group hopping according to the present disclosure for V2X is applied, group hopping may be determined based on a pseudo-random sequence value of c(8(symbol number)+0) to c(8(symbol number)+7) in a first symbol of a first slot to which a DM-RS is mapped (herein, this symbol may be a symbol located in the same location of a symbol to which a DM-RS is mapped in a first slot in the LTE PUSCH-based D2D (ProSe)).

Hereinafter, an orthogonal sequence (OCC) and a cyclic shift according to the present disclosure will be described.

A cyclic shift and an orthogonal sequence (OCC) are taken into consideration to minimize interference from neighbor terminals when a DM-RS is generated. In the case of D2D (ProSe), a length 2 orthogonal cover code (OCC) is applied as the orthogonal sequence (OCC) by taking into account the case in which a DM-RS is transmitted through two symbols in a single subframe. However, in the case of V2X, a length 4 orthogonal cover code (OCC) may be considered as an orthogonal sequence (OCC) by taking into account the case in which a DM-RS is transmitted through four symbols in a single subframe. Accordingly, an orthogonal sequence (OCC) needs to be changed to effectively minimize interference among neighbor terminals. Also, application of an effective cyclic shift also needs to be considered along with changing the orthogonal sequence (OCC).

Here, when a DM-RS is transmitted through four symbols in the single subframe, the locations of two symbols out of the four symbols in the subframe are the same as the locations of two symbols through which a DM-RS is transmitted in the single subframe in D2D (ProSe), and the locations of the remaining two symbols are configured additionally. This method may be effective from the perspective of the minimization of interference from a neighbor terminal.

In the case in which a terminal that transmits a DM-RS in the environment of V2X and a terminal that transmits a DM-RS in the environment of D2D (ProSe) coexist, when the application of an orthogonal sequence (OCC) for the transmission of a DM-RS in the V2X environment is extended based on the application of an orthogonal sequence (OCC) for the transmission of a DM-RS in the D2D (ProSe), mutual interference may be alleviated through an orthogonal sequence (OCC). For example, when an orthogonal sequence (OCC) application scheme for two symbols out of four symbols in a single subframe when a DM-RS is transmitted in the V2X environment is the same as an orthogonal sequence (OCC) application scheme for two symbols in a single subframe when a DM-RS is transmitted in D2D (ProSe), mutual interference may be alleviated in the two symbols.

As described above, in the case of V2X, a method of transmitting a DM-RS through four symbols in a single subframe may be preferentially considered by taking into consideration high Doppler effect or the like. However, in the case of a PSBCH that transmits together with a sidelink synchronization signal (SLSS) in a subframe, a method of transmitting a DM-RS through three symbols in a single subframe may be considered by taking into account symbols for the SLSS. In this instance, a length 3 orthogonal cover code (OCC) may be considered as an orthogonal sequence (OCC). Accordingly, an orthogonal sequence (OCC) may need to be changed to effectively minimize interference among neighbor terminals. Also, the application of an effective cyclic shift also needs to be considered along with changing the orthogonal sequence (OCC).

First, the case in which two types of OCCs are used like the D2D (ProSe) and the length of an OCC is 4 (method 1 −1 and method 1 −2 for an orthogonal sequence (OCC) and a cyclic shift) may be considered for V2X, whereas two length 2 OCCs are used in the case of D2D (ProSe). Although this may be applied to the example illustrated in the part (a) of FIG. 5, the present disclosure may not be limited thereto.

This will be described in details as follows.

[Method 1 −1 for Orthogonal Sequence (OCC) and Cyclic Shift]

This is the case in which a normal CP is used, one of two symbols through which a DM-RS is transmitted in each slot is a fourth symbol (symbol #3) of each slot, in the same manner as a DM-RS that links with an existing UL PUSCH or a DM-RS that links with a PSSCH/PSCCH/PDSCH/PSBCH in D2D(ProSe), and the other symbol is one of the subsequent symbols (a fifth symbol (symbol #4), a sixth symbol (symbol #5), and a seventh symbol (symbol #6)) in the slot.

Also, this is the case in which an extended CP is used, one of two symbols through which a DM-RS is transmitted in each slot is a third symbol (symbol #2) of each slot, in the same manner as a DM-RS that links with an existing UL PUSCH or a DM-RS that links with a PSSCH/PSCCH/PDSCH/PSBCH in D2D(ProSe), and the other symbol is one of the subsequent symbols (a fourth symbol (symbol #3), a fifth symbol (symbol #4), and a sixth symbol (symbol #5)) in the slot.

In this instance, this is the case in which the locations of two symbols out of the four symbols in a single subframe are the same as the locations of two symbols for D2D(ProSe) and the remaining two symbols are added, and thus, V2X may always transmit a DM-RS through a total of four symbols in a single subframe by adding two symbols in addition to two existing symbols in the single subframe. Alternatively, one out of two schemes may be selected and used, the schemes including a scheme (scheme #1) that transmits a DM-RS through two existing symbols in a single subframe in the same manner as D2D (ProSe), through a higher layer signaling such as RRC or the like, and a scheme (scheme #2) that transmits a DM-RS through a total of four symbols by adding two symbols in addition to the two existing symbols in the single subframe.

TABLE 8

| Parameter | | PSSCH | PSCCH |
|---|---|---|---|
| Cyclic shift | $n_{cs, \lambda}$ | $\lfloor n_{ID}^{SA}/2 \rfloor \bmod 8$ | 0 |
| Orthogonal sequence | $[w^\lambda(0)\ w^\lambda(1)\ w^\lambda(2)\ w^\lambda(3)]$ | $[+1\ +1\ +1\ +1]$ if $n_{ID}^{SA} \bmod 2 = 0$<br>$[+1\ -1\ -1\ +1]$ if $n_{ID}^{SA} \bmod 2 = 1$ | $[+1\ +1\ +1\ +1]$ |
| Parameter | | PSDCH | PSBCH |
| Cyclic shift | $n_{cs, \lambda}$ | 0 | $\lfloor N_{ID}^{SL}/2 \rfloor \bmod 8$ |
| Orthogonal sequence | $[w^\lambda(0)\ w^\lambda(1)\ w^\lambda(2)\ w^\lambda(3)]$ | $[+1\ +1\ +1\ +1]$ | $[+1\ +1\ +1\ +1]$ if $N_{ID}^{SL} \bmod 2 = 0$<br>$[+1\ -1\ -1\ +1]$ if $N_{ID}^{SL} \bmod 2 = 1$ |

As shown in Table 8, $[+1\ +1\ +1\ +1]$ and $[+1\ -1\ -1\ +1]$ may be used as two types of length 4 OCCs by taking into consideration the DM-RS transmission of a DM-RS that links with a PSSCH and a PSBCH through a total of 4 symbols in a single subframe.

By taking into consideration the DM-RS transmission of a DM-RS that links with a PSSCH and a PSBCH in D2D (ProSe) through a total of two symbols in a single subframe, two types of length 2 OCCs, that is, [+1 +1] and [+1 −1] may be used. This may be extended to [+1 +1 +1 +1] and [+1 −1 +1 −1] by taking into consideration the DM-RS transmission through a total of four symbols in a single subframe. However, in this instance, OCC mapping in two symbols (a first symbol and a third symbol out of four symbols) of which the locations are the same as the existing D2D (ProSe), out of four symbols, may be changed, and thus, the OCC configuration as shown in Table 8 may be preferable.

Further, in association with a cyclic shift, the configuration that is the same as the configuration in D2D (ProSe) may be possible.

[Method 1 −2 for Orthogonal Sequence (OCC) and Cyclic Shift]

This is the case in which a normal CP is used, one of two symbols through which a DM-RS is transmitted in each slot is a fourth symbol (symbol #3) of each slot in the same manner as a DM-RS that links with an existing UL PUSCH or a DM-RS that links with a PSSCH/PSCCH/PDSCH/PSBCH in D2D(ProSe), and the other symbol is one of the previous symbols (a first symbol (symbol #0), a second symbol (symbol #1), and a third symbol (symbol #2)) in the slot.

Also, this is the case in which an extended CP is used, one of two symbols through which a DM-RS is transmitted in each slot is a third symbol (symbol #2) of each slot, in the same manner as a DM-RS that links with an existing UL PUSCH or a DM-RS that links with a PSSCH/PSCCH/PDSCH/PSBCH in D2D(ProSe), and the other symbol is one of the previous symbols (a first symbol (symbol #0) and a second symbol (symbol #1)) in the slot.

In this instance, this is the case in which the locations of two symbols out of the four symbols in a single subframe are the same as the locations of two symbols for D2D(ProSe) and the remaining two symbols are added, and thus, V2X may always transmit a DM-RS through a total of four symbols by adding two symbols in addition to two existing symbols in the single subframe. Alternatively, one out of two schemes may be selected and used, the schemes including a scheme (scheme #1) that transmits a DM-RS through two existing symbols in a single subframe in the same manner as D2D (ProSe), through a higher layer signaling such as RRC or the like, and a scheme (scheme #2) that transmits a DM-RS through a total of four symbols by adding two symbols in addition to the two existing symbols in the single subframe.

By taking into consideration the DM-RS transmission of a DM-RS that links with a PSSCH and a PSBCH in D2D (ProSe) through a total of two symbols in a single subframe, two types of length 2 OCCs, that is, [+1 +1] and [+1 −1] may be used. This may be extended to [+1 +1 +1 +1] and [+1 −1 +1 −1] by taking into consideration the DM-RS transmission through a total of four symbols in a single subframe. However, in this instance, OCC mapping in two symbols (a second symbol and a fourth symbol out of four symbols) of which the locations are the same as the existing D2D (ProSe), out of four symbols, may be changed, and thus, the OCC configuration as shown in Table 9 may be preferable.

Further, in association with a cyclic shift, the configuration that is the same as the configuration in D2D (ProSe) may be possible.

Subsequently, the case in which the number of types of OCCs is extended to 4 and the length of an OCC is 4 (method 2-1, method 2-2, method 3-1, and method 3-2 for an orthogonal sequence (OCC) and a cyclic shift) may be considered for V2X, whereas two length 2 OCCs are used in the case of D2D (ProSe). Although this may be applied to the example illustrated in the part (a) of FIG. 5, the present disclosure may not be limited thereto.

[Method 2-1 for Orthogonal Sequence (OCC) and Cyclic Shift]

This is the case in which a normal CP is used, one of two symbols through which a DM-RS is transmitted in each slot is a fourth symbol (symbol #3) of each slot, in the same manner as a DM-RS that links with a UL PUSCH or a DM-RS that links with a PSSCH/PSCCH/PDSCH/PSBCH in D2D(ProSe), and the other symbol is one of subsequent symbols (a fifth symbol (symbol #4), a sixth symbol (symbol #5), and a seventh symbol (symbol #6)) in the slot.

Also, this is the case in which an extended CP is used, one of two symbols through which a DM-RS is transmitted in each slot is a third symbol (symbol #2) of each slot, in the same manner as a DM-RS that links with an existing UL PUSCH or a DM-RS that links with a PSSCH/PSCCH/PDSCH/PSBCH in D2D(ProSe), and the other symbol is one of the subsequent symbols (a fourth symbol (symbol #3), a fifth symbol (symbol #4), and a sixth symbol (symbol #5)) in the slot.

In this instance, this is the case in which the locations of two symbols out of the four symbols in a single subframe are the same as the locations of two symbols for D2D(ProSe) and the remaining two symbols are added, and thus, V2X may always transmit a DM-RS through a total of four symbols by adding two symbols in addition to two existing

TABLE 9

| Parameter | | PSSCH | PSCCH |
|---|---|---|---|
| Cyclic shift | $n_{cs, \lambda}$ | $\lfloor n_{ID}^{SA}/2 \rfloor \mod 8$ | 0 |
| Orthogonal sequence | $[w^\lambda(0)\ w^\lambda(1)\ w^\lambda(2)\ w^\lambda(3)]$ | [+1 +1 +1 +1] if $n_{ID}^{SA} \mod 2 = 0$<br>[−1 +1 +1 −1] if $n_{ID}^{SA} \mod 2 = 1$ | [+1 +1 +1 +1] |

| Parameter | | PSDCH | PSBCH |
|---|---|---|---|
| Cyclic shift | $n_{cs, \lambda}$ | 0 | $\lfloor N_{ID}^{SL}/2 \rfloor \mod 8$ |
| Orthogonal sequence | $[w^\lambda(0)\ w^\lambda(1)\ w^\lambda(2)\ w^\lambda(3)]$ | [+1 +1 +1 +1] | [+1 +1 +1 +1] if $N_{ID}^{SL} \mod 2 = 0$<br>[−1 +1 +1 −1] if $N_{ID}^{SL} \mod 2 = 1$ |

As shown in Table 9, [+1 +1 +1 +1] and [−1 +1 +1 −1] may be used as two types of length 4 OCCs by taking into consideration the DM-RS transmission of a DM-RS that links with a PSSCH and a PSBCH through a total of 4 symbols in a single subframe.

symbols in the single subframe. Alternatively, one out of two schemes may be selected and used, the schemes including a scheme (scheme #1) that transmits a DM-RS through two existing symbols in a single subframe in the same manner as D2D (ProSe), through a higher layer signaling such as RRC or the like, and a scheme (scheme #2) that transmits a DM-RS through a total of four symbols by adding two symbols in addition to the two existing symbols in the single subframe.

TABLE 10

| Parameter | | PSSCH | PSCCH |
|---|---|---|---|
| Cyclic shift | $n_{cs,\lambda}$ | $\lfloor n_{ID}^{SA}/2 \rfloor \bmod 8$ | 0 |
| Orthogonal sequence | $[w^\lambda(0)\ w^\lambda(1)\ w^\lambda(2)\ w^\lambda(3)]$ | [+1 +1 +1 +1] if $n_{ID}^{SA}$ mod4 = 0<br>[+1 −1 −1 +1] if $n_{ID}^{SA}$ mod4 = 1<br>[+1 −1 +1 −1] if $n_{ID}^{SA}$ mod4 = 2<br>[+1 +1 −1 −1] if $n_{ID}^{SA}$ mod4 = 3 | [+1 +1 +1 +1] |

| Parameter | | PSDCH | PSBCH |
|---|---|---|---|
| Cyclic shift | $n_{cs,\lambda}$ | 0 | $\lfloor N_{ID}^{SL}/2 \rfloor \bmod 8$ |
| Orthogonal sequence | $[w^\lambda(0)\ w^\lambda(1)\ w^\lambda(2)\ w^\lambda(3)]$ | [+1 +1 +1 +1] | [+1 +1 +1 +1] if $N_{ID}^{SL}$ mod4 = 0<br>[+1 −1 −1 +1] if $N_{ID}^{SL}$ mod4 = 1<br>[+1 −1 +1 −1] if $N_{ID}^{SL}$ mod4 = 2<br>[+1 +1 −1 −1] if $N_{ID}^{SL}$ mod4 = 3 |

As shown in Table 10, [+1 +1 +1 +1], [+1 −1 −1 +1], [+1 −1 +1−1], and [+1 +1 −1 −1] may be used as four types of length 4 OCCs by taking into consideration the DM-RS transmission of a DM-RS that links with a PSSCH and a PSBCH through a total of 4 symbols in a single subframe.

The four length 4 OCCs, that is, [+1 +1 +1 +1], [+1 −1 −1 +1], [+1 −1 +1−1], and [+1 +1 −1 −1] may be used respectively for the cases having remainders of 0, 1, 2, and 3 that are obtained by dividing $n_{ID}^{SA}$ by 4 in the case of a DM-RS that links with a PSSCH, and may be used respectively for the cases having remainders of 0, 1, 2, and 3 that are obtained by dividing $n_{ID}^{SL}$ by 4 in the case of a DM-RS that links with a PSBCH.

This is an OCC configuration that maintains OCC mapping in two symbols (a first symbol and a third symbol out of four symbols) of which the locations are the same as the existing D2D (ProSe). That is, in the case of a DM-RS that links with a PSSCH, when remainders obtained by dividing $n_{ID}^{SA}$ by 2 are 0 and 1, OCC values of a first symbol and a third symbol are [+1 +1] and [+1, −1], respectively.

Further, in association with a cyclic shift, the configuration that is the same as the configuration in D2D (ProSe) may be possible. However, different OCCs may be applied to two adjacent cyclic shift values, and thus, interference between neighbor UEs may be further reduced.

[Method 2-2 for Orthogonal Sequence (OCC) and Cyclic Shift]

This is the case in which a normal CP is used, one of two symbols through which a DM-RS is transmitted in each slot is a fourth symbol (symbol #3) of each slot in the same manner as a DM-RS that links with an existing UL PUSCH or a DM-RS that links with a PSSCH/PSCCH/PDSCH/PSBCH in D2D(ProSe), and the other symbol is one of the previous symbols (a first symbol (symbol #0), a second symbol (symbol #1), and a third symbol (symbol #2)) in the slot.

Also, this is the case in which an extended CP is used, one of two symbols through which a DM-RS is transmitted in each slot is a third symbol (symbol #2) of each slot, in the same manner as a DM-RS that links with an existing UL PUSCH or a DM-RS that links with a PSSCH/PSCCH/PDSCH/PSBCH in D2D(ProSe), and the other symbol is one of the previous symbols (a first symbol (symbol #0) and a second symbol (symbol #1)) in the slot.

In this instance, this is the case in which the locations of two symbols out of the four symbols in a single subframe are the same as the locations of two symbols for D2D(ProSe) and the remaining two symbols are added, and thus, V2X may always transmit a DM-RS through a total of four symbols by adding two symbols in addition to two existing symbols in the single subframe. Alternatively, one out of two schemes may be selected and used, the schemes including a scheme (scheme #1) that transmits a DM-RS through two existing symbols in a single subframe in the same manner as D2D (ProSe), through a higher layer signaling such as RRC or the like, and a scheme (scheme #2) that transmits a DM-RS by adding two symbols in addition to the two existing symbols in the single subframe.

TABLE 11

| Parameter | | PSSCH | PSCCH |
|---|---|---|---|
| Cyclic shift | $n_{cs,\lambda}$ | $\lfloor n_{ID}^{SA}/2 \rfloor \bmod 8$ | 0 |
| Orthogonal sequence | $[w^\lambda(0)\ w^\lambda(1)\ w^\lambda(2)\ w^\lambda(3)]$ | [+1 +1 +1 −1] if $n_{ID}^{SA}$ mod4 = 0<br>[−1 +1 +1 −1] if $n_{ID}^{SA}$ mod4 = 1<br>[−1 +1 −1 +1] if $n_{ID}^{SA}$ mod4 = 2<br>[+1 +1 −1 −1] if $n_{ID}^{SA}$ mod4 = 3 | [+1 +1 +1 +1] |

| Parameter | | PSDCH | PSDCH |
|---|---|---|---|
| Cyclic shift | $n_{cs,\lambda}$ | 0 | $\lfloor N_{ID}^{SL}/2 \rfloor \bmod 8$ |
| Orthogonal sequence | $[w^\lambda(0)\ w^\lambda(1)\ w^\lambda(2)\ w^\lambda(3)]$ | [+1 +1 +1 +1] | [+1 +1 +1 +1] if $N_{ID}^{SL}$ mod4 = 0<br>[−1 +1 +1 −1] if $N_{ID}^{SL}$ mod4 = 1<br>[−1 +1 −1 +1] if $N_{ID}^{SL}$ mod4 = 2<br>[+1 +1 −1 −1] if $N_{ID}^{SL}$ mod4 = 3 |

As shown in Table 11, [+1 +1 +1 +1], [−1 +1 +1 −1], [−1 +1 −1 +1], and [+1 +1 −1 −1] may be used as four types of length 4 OCCs by taking into consideration the DM-RS transmission of a DM-RS that links with a PSSCH and a PSBCH through a total of 4 symbols in a single subframe.

The four length 4 OCCs, that is, [+1 +1 +1 +1], [−1 +1 +1 −1], [−1 +1 −1 +1], and [+1 +1 −1 −1] may be used respectively for the cases having remainders of 0, 1, 2, and 3 that are obtained by dividing $n^{SA}_{ID}$ by 4 in the case of a DM-RS that links with a PSSCH, and may be used respectively for the cases having remainders of 0, 1, 2, and 3 that are obtained by dividing $n^{SL}_{ID}$ by 4 in the case of a DM-RS that links with a PSBCH.

In this instance, this is the case in which the locations of two symbols out of the four symbols in a single subframe are the same as the locations of two symbols for D2D(ProSe) and the remaining two symbols are added, and thus, V2X may always transmit a DM-RS through a total of four symbols by adding two symbols in addition to two existing symbols in the single subframe. Alternatively, one out of two schemes may be selected and used, the schemes including a scheme (scheme #1) that transmits a DM-RS through two existing symbols in a single subframe in the same manner as D2D (ProSe), through a higher layer signaling such as RRC or the like, and a scheme (scheme #2) that transmits a DM-RS by adding two symbols in addition to the two existing symbols in the single subframe.

TABLE 12

| Parameter | | PSSCH | PSCCH |
|---|---|---|---|
| Cyclic shift | $n_{cs, \lambda}$ | $\lfloor n^{SA}_{ID}/4 \rfloor \mod 8$ | 0 |
| Orthogonal sequence | $[w^\lambda(0)\ w^\lambda(1)\ w^\lambda(2)\ w^\lambda(3)]$ | [+1 +1 +1 +1] if $n^{SA}_{ID} \mod 4 = 0$<br>[+1 −1 −1 +1] if $n^{SA}_{ID} \mod 4 = 1$<br>[+1 −1 +1 −1] if $n^{SA}_{ID} \mod 4 = 2$<br>[+1 +1 −1 −1] if $n^{SA}_{ID} \mod 4 = 3$ | [+1 +1 +1 +1] |

| Parameter | | PSDCH | PSDCH |
|---|---|---|---|
| Cyclic shift | $n_{cs, \lambda}$ | 0 | $\lfloor N^{SL}_{ID}/4 \rfloor \mod 8$ |
| Orthogonal sequence | $[w^\lambda(0)\ w^\lambda(1)\ w^\lambda(2)\ w^\lambda(3)]$ | [+1 +1 +1 +1] | [+1 +1 +1 +1] if $N^{SL}_{ID} \mod 4 = 0$<br>[+1 −1 −1 +1] if $N^{SL}_{ID} \mod 4 = 1$<br>[+1 −1 +1 −1] if $N^{SL}_{ID} \mod 4 = 2$<br>[+1 +1 −1 −1] if $N^{SL}_{ID} \mod 4 = 3$ |

This is an OCC configuration that maintains OCC mapping in two symbols (a second symbol and a fourth symbol out of four symbols) of which the locations are the same as the existing D2D (ProSe). That is, in the case of a DM-RS that links with a PSSCH, when remainders obtained by dividing $n^{SA}_{ID}$ by 2 are 0 and 1, OCC values of a second symbol and a fourth symbol are [+1 +1] and [+1 −1], respectively. Also, in the case of a DM-RS that links with a PSBCH, when remainders obtained by dividing $n^{SL}_{ID}$ by 2 are 0 and 1, OCC values of a second symbol and a fourth symbol are [+1 +1] and [+1 −1], respectively.

Further, in association with a cyclic shift, the configuration that is the same as the configuration in D2D (ProSe) may be possible. However, different OCCs may be applied to two adjacent cyclic shift values, and thus, interference between neighbor UEs may be further reduced.

[Method 3-1 for Orthogonal Sequence (OCC) and Cyclic Shift]

This is the case in which a normal CP is used, one of two symbols through which a DM-RS is transmitted in each slot is a fourth symbol (symbol #3) of each slot, in the same manner as a DM-RS that links with a UL PUSCH or a DM-RS that links with a PSSCH/PSCCH/PDSCH/PSBCH in D2D(ProSe), and the other symbol is one of the subsequent symbols (a fifth symbol (symbol #4), a sixth symbol (symbol #5), and a seventh symbol (symbol #6)) in the slot.

Also, this is the case in which an extended CP is used, one of two symbols through which a DM-RS is transmitted in each slot is a third symbol (symbol #2) of each slot, in the same manner as a DM-RS that links with an existing UL PUSCH or a DM-RS that links with a PSSCH/PSCCH/PDSCH/PSBCH in D2D(ProSe), and the other symbol is one of the subsequent symbols (a fourth symbol (symbol #3), a fifth symbol (symbol #4), and a sixth symbol (symbol #5)) in the slot.

As shown in Table 12, [+1 +1 +1 +1], [+1 −1 −1 +1], [+1 −1 +1−1], and [+1 +1 −1 −1] may be used as four types of length 4 OCCs by taking into consideration the DM-RS transmission of a DM-RS that links with a PSSCH and a PSBCH through a total of 4 symbols in a single subframe.

The four length 4 OCCs, that is, [+1 +1 +1 +1], [+1 −1 −1 +1], [+1 −1 +1−1], and [+1 +1 −1 −1] may be used respectively for the cases having remainders of 0, 1, 2, and 3 that are obtained by dividing $n^{SA}_{ID}$ by 4 in the case of a DM-RS that links with a PSSCH, and may be used respectively for the cases having remainders of 0, 1, 2, and 3 that are obtained by dividing $n^{SL}_{ID}$ by 4 in the case of a DM-RS that links with a PSBCH.

This is an OCC configuration that maintains OCC mapping in two symbols (a first symbol and a third symbol out of four symbols) of which the locations are the same as the existing D2D (ProSe). That is, in the case of a DM-RS that links with a PSSCH, when remainders obtained by dividing $n^{SA}_{ID}$ by 2, OCC values of a first symbol and a third symbol are [+1 +1] and [+1 −1], respectively.

Further, in association with a cyclic shift, in the case of a DM-RS that links with a PSSCH in D2D (ProSe), one out of 8 cyclic shift values is determined by executing modulo8 (mod 8) on a value obtained by dividing $n^{SA}_{ID}$ by 2, whereas, in the case of a DM-RS that links with a PSSCH in V2X, one out of 8 cyclic shift values is determined by executing modulo8 (mod 8) on a value obtained by dividing $n^{SA}_{ID}$ by 4. In the same manner, in the case of a DM-RS that links with a PSBCH in D2D (ProSe), one out of 8 cyclic shift values is determined by executing modulo8 (mod 8) on a value obtained by dividing $n^{SL}_{ID}$ by 2, whereas, in the case of a DM-RS that links with a PSBCH in V2X, one out of 8 cyclic shift values is determined by executing modulo 8 (mod 8) on a value obtained by dividing $n^{SL}_{ID}$ by 4. Further, in the case of a DM-RS that links with a PSBCH in D2D (ProSe), one out of 30 sequence shift patterns $f_{ss}$ in group hopping is determined by executing modulo30 (mod 30) on a value obtained by dividing $n^{SL}_{ID}$ by 16, whereas, in the case of a DM-RS that links with a PSBCH in V2X, one out of 30 sequence shift patterns $f_{ss}$ in group hopping is determined by executing modulo 30 (mod 30) on a value obtained by dividing $n^{SL}_{ID}$ by 32.

[Method 3-2 for Orthogonal Sequence (OCC) and Cyclic Shift]

This is the case in which a normal CP is used, one of two symbols through which a DM-RS is transmitted in each slot is a fourth symbol (symbol #3) of each slot in the same manner as a DM-RS that links with an existing UL PUSCH or a DM-RS that links with a PSSCH/PSCCH/PDSCH/PSBCH in D2D(ProSe), and the other symbol is one of the previous symbols (a first symbol (symbol #0), a second symbol (symbol #1), and a third symbol (symbol #2)).

Also, this is the case in which an extended CP is used, one of two symbols through which a DM-RS is transmitted in each slot is a third symbol (symbol #2) of each slot, in the same manner as a DM-RS that links with an existing UL PUSCH or a DM-RS that links with a PSSCH/PSCCH/PDSCH/PSBCH in D2D(ProSe), and the other symbol is one of the previous symbols (a first symbol (symbol #0) and a second symbol (symbol #1)).

In this instance, this is the case in which the locations of two symbols out of the four symbols in a single subframe are the same as the locations of two symbols for D2D(ProSe) and the remaining two symbols are added, and thus, V2X may always transmit a DM-RS through a total of four symbols by adding two symbols in addition to two existing symbols in the single subframe. Alternatively, one out of two schemes may be selected and used, the schemes including a scheme (scheme #1) that transmits a DM-RS through two existing symbols in a single subframe in the same manner as D2D (ProSe), through a higher layer signaling such as RRC or the like, and a scheme (scheme #2) that transmits a DM-RS by adding two symbols in addition to the two existing symbols in the single subframe.

are obtained by dividing $n^{SL}_{ID}$ by 4 in the case of a DM-RS that links with a PSBCH.

This is an OCC configuration that maintains OCC mapping in two symbols (a second symbol and a fourth symbol out of four symbols) of which the locations are the same as the existing D2D (ProSe). That is, in the case of a DM-RS that links with a PSSCH, when remainders obtained by dividing $n^{SA}_{ID}$ by 2 are 0 and 1, OCC values of a second symbol and a fourth symbol are [+1 +1] and [+1 −1], respectively.

Further, in association with a cyclic shift, in the case of a DM-RS that links with a PSSCH in D2D (ProSe), one out of 8 cyclic shift values is determined by executing modulo8 (mod 8) on a value obtained by dividing $n^{SA}_{ID}$ by 2, whereas, in the case of a DM-RS that links with a PSSCH in V2X, one out of 8 cyclic shift values may be determined by executing modulo 8 (mod 8) on a value obtained by dividing $n^{SA}_{ID}$ by 4. In the same manner, in the case of a DM-RS that links with a PSBCH in D2D (ProSe), one out of 8 cyclic shift values is determined by executing modulo 8 (mod 8) on a value obtained by dividing $n^{SL}_{ID}$ by 2, whereas, in the case of a DM-RS that links with a PSBCH in V2X, one out of 8 cyclic shift values may be determined by executing modulo 8 (mod 8) on a value obtained by dividing $n^{SL}_{ID}$ by 4. Further, in the case of a DM-RS that links with a PSBCH in D2D (ProSe), one out of 30 sequence shift patterns $f_{ss}$ in group hopping is determined by executing modulo30 (mod 30) on a value obtained by dividing $n^{SL}_{ID}$ by 16, whereas, in the case of a DM-RS that links with a PSBCH in V2X, one out of 30 sequence shift patterns $f_{ss}$ in group hopping may be determined by executing modulo30 (mod 30) on a value obtained by dividing $n^{SL}_{ID}$ by 32.

Subsequently, the case in which two types of OCCs are used like the D2D (ProSe) and the length of an OCC is 4 (method 4 for an orthogonal sequence (OCC) and a cyclic shift) may be considered for V2X, whereas two length 2 OCCs are used in the case of D2D (ProSe). Although this may be applied to the example illustrated in the part (b) of

TABLE 13

| Parameter | | PSSCH | PSCCH |
|---|---|---|---|
| Cyclic shift | $n_{cs,\lambda}$ | $\lfloor n^{SA}_{ID}/4 \rfloor \bmod 8$ | 0 |
| Orthogonal sequence | $[w^\lambda(0)\ w^\lambda(1)\ w^\lambda(2)\ w^\lambda(3)]$ | [+1 +1 +1 +1] if $n^{SA}_{ID}$ mod4 = 0<br>[−1 +1 +1 −1] if $n^{SA}_{ID}$ mod4 = 1<br>[−1 +1 −1 +1] if $n^{SA}_{ID}$ mod4 = 2<br>[+1 +1 −1 −1] if $n^{SA}_{ID}$ mod4 = 3 | [+1 +1 +1 +1] |

| Parameter | | PSDCH | PSDCH |
|---|---|---|---|
| Cyclic shift | $n_{cs,\lambda}$ | 0 | $\lfloor N^{SL}_{ID}/4 \rfloor \bmod 8$ |
| Orthogonal sequence | $[w^\lambda(0)\ w^\lambda(1)\ w^\lambda(2)\ w^\lambda(3)]$ | [+1 +1 +1 +1] | [+1 +1 +1 +1] if $N^{SL}_{ID}$ mod4 = 0<br>[−1 +1 +1 −1] if $N^{SL}_{ID}$ mod4 = 1<br>[−1 +1 −1 +1] if $N^{SL}_{ID}$ mod4 = 2<br>[+1 +1 −1 −1] if $N^{SL}_{ID}$ mod4 = 3 |

As shown in Table 13, [+1 +1 +1 +1], [−1 +1 +1 −1], [−1 +1 −1 +1], and [+1 +1 −1 −1] may be used as four types of length 4 OCCs by taking into consideration the DM-RS transmission of a DM-RS that links with a PSSCH and a PSBCH through a total of 4 symbols in a single subframe.

The four length 4 OCCs, that is, [+1 +1 +1 +1], [−1 +1 +1 −1], [−1 +1 −1 +1], and [+1 +1 −1 −1] may be used respectively for the cases having remainders of 0, 1, 2, and 3 that are obtained by dividing $n^{SA}_{ID}$ by 4 in the case of a DM-RS that links with a PSSCH, and may be used respectively for the cases having remainders of 0, 1, 2, and 3 that FIG. 5, the present disclosure may not be limited thereto.

[Method 4 for Orthogonal Sequence (OCC) and Cyclic Shift]

This is the case in which a normal CP is used and, two symbols out of seven symbols in each of a first slot and a second slot are determined as symbols through which a DM-RS is transmitted.

Also, this is the case in which an extended CP is used and, two symbols out of six symbols in each of a first slot and a second slot are determined as symbols through which a DM-RS is transmitted.

To this end, one out of two schemes may be selected and used, the schemes including a scheme (scheme #1) that transmits a DM-RS through two existing symbols in a single subframe in the same manner as D2D (ProSe), through a higher layer signaling such as RRC or the like, and a scheme (scheme #2) that transmits a DM-RS through a total of four symbols in the single subframe.

TABLE 14

| Parameter | | PSSCH | PSCCH |
|---|---|---|---|
| Cyclic shift | $n_{cs,\lambda}$ | $\lfloor n_{ID}^{SA}/2 \rfloor \bmod 8$ | 0 |
| Orthogonal sequence | $[w^\lambda(0)\ w^\lambda(1)\ w^\lambda(2)\ w^\lambda(3)]$ | $[+1\ +1\ +1\ +1]$ if $n_{ID}^{SA} \bmod 2 = 0$<br>$[+1\ -1\ +1\ -1]$ if $n_{ID}^{SA} \bmod 2 = 1$ | $[+1\ +1\ +1\ +1]$ |

| Parameter | | PSDCH | PSBCH |
|---|---|---|---|
| Cyclic shift | $n_{cs,\lambda}$ | 0 | $\lfloor N_{ID}^{SL}/2 \rfloor \bmod 8$ |
| Orthogonal sequence | $[w^\lambda(0)\ w^\lambda(1)\ w^\lambda(2)\ w^\lambda(3)]$ | $[+1\ +1\ +1\ +1]$ | $[+1\ +1\ +1\ +1]$ if $N_{ID}^{SL} \bmod 2 = 0$<br>$[+1\ -1\ +1\ -1]$ if $N_{ID}^{SL} \bmod 2 = 1$ |

As shown in Table 14, $[+1\ +1\ +1\ +1]$ and $[+1\ -1\ +1\ -1]$ may be used as two types of length 4 OCCs by taking into consideration the DM-RS transmission of a DM-RS that links with a PSSCH and a PSBCH through a total of 4 symbols in a single subframe.

The two length 4 OCCs, that is, $[+1\ +1\ +1\ +1]$ and $[+1\ -1\ +1\ -1]$ may be used respectively for the cases having remainders of 0 and 1 that are obtained by dividing $n_{ID}^{SA}$ by 2 in the case of a DM-RS that links with a PSSCH, and may be used respectively for the cases having remainders of 0 and 1 that are obtained by dividing $n_{ID}^{SL}$ by 2 in the case of a DM-RS that links with a PSBCH.

Further, in association with a cyclic shift, the configuration that is the same as the configuration in D2D (ProSe) may be possible.

Subsequently, the case in which the number of types of OCCs is extended to 4 and the length of an OCC is 4 (method 5 and method 6 for an orthogonal sequence (OCC) and a cyclic shift) may be considered for V2X, whereas two length 2 OCCs are used in the case of D2D (ProSe). Although this may be applied to the example illustrated in the part (b) of FIG. 5, the present disclosure may not be limited thereto.

[Method 5 for Orthogonal Sequence (OCC) and Cyclic Shift]

This is the case in which a normal CP is used and two symbols out of seven symbols in each of a first slot and a second slot are determined as symbols through which a DM-RS is transmitted.

Also, this is the case in which an extended CP is used and two symbols out of six symbols in each of a first slot and a second slot are determined as symbols through which a DM-RS is transmitted.

To this end, one out of two schemes may be selected and used, the schemes including a scheme (scheme #1) that transmits a DM-RS through two existing symbols in a single subframe in the same manner as D2D (ProSe), through a higher layer signaling such as RRC or the like, and a scheme (scheme #2) that transmits a DM-RS through a total of four symbols in the single subframe.

TABLE 15

| Parameter | | PSSCH | PSCCH |
|---|---|---|---|
| Cyclic shift | $n_{cs,\lambda}$ | $\lfloor n_{ID}^{SA}/2 \rfloor \bmod 8$ | 0 |
| Orthogonal sequence | $[w^\lambda(0)\ w^\lambda(1)\ w^\lambda(2)\ w^\lambda(3)]$ | $[+1\ +1\ +1\ +1]$ if $n_{ID}^{SA} \bmod 4 = 0$<br>$[+1\ -1\ +1\ -1]$ if $n_{ID}^{SA} \bmod 4 = 1$<br>$[+1\ +1\ -1\ -1]$ if $n_{ID}^{SA} \bmod 4 = 2$<br>$[+1\ -1\ -1\ +1]$ if $n_{ID}^{SA} \bmod 4 = 3$ | $[+1\ +1\ +1\ +1]$ |

| Parameter | | PSDCH | PSBCH |
|---|---|---|---|
| Cyclic shift | $n_{cs,\lambda}$ | 0 | $\lfloor N_{ID}^{SL}/2 \rfloor \bmod 8$ |
| Orthogonal sequence | $[w^\lambda(0)\ w^\lambda(1)\ w^\lambda(2)\ w^\lambda(3)]$ | $[+1\ +1\ +1\ +1]$ | $[+1\ +1\ +1\ +1]$ if $N_{ID}^{SL} \bmod 4 = 0$<br>$[+1\ -1\ +1\ -1]$ if $N_{ID}^{SL} \bmod 4 = 1$<br>$[+1\ +1\ -1\ -1]$ if $N_{ID}^{SL} \bmod 4 = 2$<br>$[+1\ -1\ -1\ +1]$ if $N_{ID}^{SL} \bmod 4 = 3$ |

As shown in Table 15, $[+1\ +1\ +1\ +1]$, $[+1\ -1\ +1\ -1]$, $[+1\ +1\ -1\ -1]$, and $[+1\ -1\ -1\ +1]$ may be used as four types of length 4 OCCs by taking into consideration the DM-RS transmission of a DM-RS that links with a PSSCH and a PSBCH through a total of 4 symbols in a single subframe.

The four length 4 OCCs, that is, $[+1\ +1\ +1\ +1]$, $[+1\ -1\ +1\ -1]$, $[+1\ +1\ -1\ -1]$, and $[+1\ -1\ -1\ +1]$ may be used respectively for the cases having remainders of 0, 1, 2, and 3 that are obtained by dividing $n_{ID}^{SA}$ by 4 in the case of a DM-RS that links with a PSSCH, and may be used respectively for the cases having remainders of 0, 1, 2, and 3 that are obtained by dividing $n_{ID}^{SL}$ by 4 in the case of a DM-RS that links with a PSBCH.

Further, in association with a cyclic shift, the configuration that is the same as the configuration in D2D (ProSe)

may be possible. However, different OCCs may be applied to two adjacent cyclic shift values and thus, interference between neighbor UEs may be further reduced.

[Method 6 for Orthogonal Sequence (OCC) and Cyclic Shift]

This is the case in which a normal CP is used and two symbols out of seven symbols in each of a first slot and a second slot are determined as symbols through which a DM-RS is transmitted.

Also, this is the case in which an extended CP is used and two symbols out of six symbols in each of a first slot and a second slot are determined as symbols through which a DM-RS is transmitted.

To this end, one out of two schemes may be selected and used, the schemes including a scheme (scheme #1) that transmits a DM-RS through two existing symbols in a single subframe in the same manner as D2D (ProSe), through a higher layer signaling such as RRC or the like, and a scheme (scheme #2) that transmits a DM-RS through a total of four symbols in the single subframe.

a value obtained by dividing $n^{SL}_{ID}$ by 16, whereas, in the case of a DM-RS that links with a PSBCH in V2X, one out of 30 sequence shift patterns $f_{ss}$ in group hopping may be determined by executing modulo30 (mod 30) on a value obtained by dividing $n^{SL}_{ID}$ by 32.

Subsequently, the case in which two types of OCCs are used like the D2D (ProSe) and the length of an OCC is 3 (method 7 for an orthogonal sequence (OCC) and cyclic shift) may be considered for V2X, whereas two length 2 OCCs are used in the case of D2D (ProSe). Although this may be applied to the example illustrated in the part (c) of FIG. 5, the present disclosure may not be limited thereto.

[Method 7 for Orthogonal Sequence (OCC) and Cyclic Shift]

This is the case in which a normal CP is used, and three symbols out of 14 symbols in a single subframe are determined as symbols through which a DM-RS is transmitted.

Also, this is the case in which an extended CP is used, and three symbols out of 12 symbols in a single subframe are determined as symbols through which a DM-RS is transmitted.

TABLE 16

| Parameter | | PSSCH | PSCCH |
|---|---|---|---|
| Cyclic shift | $n_{cs, \lambda}$ | $\lfloor n_{ID}^{SA}/4 \rfloor \mathrm{mod}8$ | 0 |
| Orthogonal sequence | $[w^{\lambda}(0) \, w^{\lambda}(1) \, w^{\lambda}(2) \, w^{\lambda}(3)]$ | [+1 +1 +1 +1] if $n_{ID}^{SA}$ mod4 = 0<br>[+1 −1 +1 −1] if $n_{ID}^{SA}$ mod4 = 1<br>[+1 +1 −1 −1] if $n_{ID}^{SA}$ mod4 = 2<br>[+1 −1 −1 +1] if $n_{ID}^{SA}$ mod4 = 3 | [+1 +1 +1 +1] |

| Parameter | | PSDCH | PSBCH |
|---|---|---|---|
| Cyclic shift | $n_{cs, \lambda}$ | 0 | $\lfloor N_{ID}^{SL}/4 \rfloor \mathrm{mod}8$ |
| Orthogonal sequence | $[w^{\lambda}(0) \, w^{\lambda}(1) \, w^{\lambda}(2) \, w^{\lambda}(3)]$ | [+1 +1 +1 +1] | [+1 +1 +1 +1] if $N_{ID}^{SL}$ mod4 = 0<br>[+1 −1 +1 −1] if $N_{ID}^{SL}$ mod4 = 1<br>[+1 +1 −1 −1] if $N_{ID}^{SL}$ mod4 = 2<br>[+1 −1 −1 +1] if $N_{ID}^{SL}$ mod4 = 3 |

As shown in Table 16, [+1 +1 +1 +1], [+1 −1 +1 −1], [+1 +1 −1 −1], and [+1 −1 −1 +1] may be used as four types of length 4 OCCs by taking into consideration the DM-RS transmission of a DM-RS that links with a PSSCH and a PSBCH through a total of 4 symbols in a single subframe.

The four length 4 OCCs, that is, [+1 +1 +1 +1], [+1 −1 +1 −1], [+1 +1 −1 −1], and [+1 −1 −1 +1] may be used respectively for the cases having remainders of 0, 1, 2, and 3 that are obtained by dividing $n^{SA}_{ID}$ by 4 in the case of a DM-RS that links with a PSSCH, and may be used respectively for the cases having remainders of 0, 1, 2, and 3 that are obtained by dividing $n^{SL}_{ID}$ by 4 in the case of a DM-RS that links with a PSBCH.

Further, in association with a cyclic shift, in the case of a DM-RS that links with a PSSCH in D2D (ProSe), one out of 8 cyclic shift values is determined by executing modulo8 (mod 8) on a value obtained by dividing $n^{SA}_{ID}$ by 2, whereas, in the case of a DM-RS that links with a PSSCH in V2X, one out of 8 cyclic shift values may be determined by executing modulo8 (mod 8) on a value obtained by dividing $n^{SA}_{ID}$ by 4. In the same manner, in the case of a DM-RS that links with a PSBCH in D2D (ProSe), one out of 8 cyclic shift values is determined by executing modulo8 (mod 8) on a value obtained by dividing $n^{SL}_{ID}$ by 2, whereas, in the case of a DM-RS that links with a PSBCH in V2X, one out of 8 cyclic shift values is determined by executing modulo 8 (mod 8) on a value obtained by dividing $n^{SL}_{ID}$ by 4. Further, in the case of a DM-RS that links with a PSBCH in D2D (ProSe), one out of 30 sequence shift patterns $f_{ss}$ in group hopping is determined by executing modulo 30 (mod 30) on To this end, one out of two schemes may be selected and used, the schemes including a scheme (scheme #1) that transmits a DM-RS through two existing symbols in a single subframe in the same manner as D2D (ProSe), through a higher layer signaling such as RRC or the like, and a scheme (scheme #2) that transmits a DM-RS through a total of three symbols in the single subframe.

TABLE 17

| Parameter | | PSBCH |
|---|---|---|
| Cyclic shift | $n_{cs, \lambda}$ | $\lfloor N_{ID}^{SL}/2 \rfloor \mathrm{mod}8$ |
| Orthogonal sequence | $[w^{\lambda}(0) \, w^{\lambda}(1) \, w^{\lambda}(2)]$ | [+1 +1 +1] if $N_{ID}^{SL}$ mod2 = 0<br>[+1 $e^{j2\pi/3}$ $e^{j4\pi/3}$] if $N_{ID}^{SL}$ mod2 = 1 |

As shown in Table 17, [+1 +1 +1] and [+1 $e^{j2\pi/3}$ $e^{j4\pi/3}$] may be used as two types of length 3 OCCs by taking into consideration the DM-RS transmission of a DM-RS that links with a PSBCH through a total of 3 symbols in a single subframe. Alternatively, [+1 +1 +1] and [+1 $e^{j4\pi/3}$ $e^{j2\pi/3}$] may be used as the two types of length 3 OCCs.

Each of the two length 3 OCCs, that is, [+1 +1 +1] and [+1 $e^{j2\pi/3}$ $e^{j4\pi/3}$] (or [+1 +1 +1] and [+1 $e^{j4\pi/3}$ $e^{j2\pi/3}$]) may be used respectively for the cases having remainders of 0 and 1 that are obtained by dividing $n^{SL}_{ID}$ by 2 in the case of a DM-RS that links with a PSBCH.

Further, in association with a cyclic shift, the configuration that is the same as the configuration in D2D (ProSe) may be possible.

Subsequently, the case in which the number of types of OCCs is extended to 3 and the length of an OCC is 3

(method 8 and method 9 for an orthogonal sequence (OCC) and a cyclic shift) may be considered for V2X, whereas two length 2 OCCs are used in the case of D2D (ProSe). Although this may be applied to the example illustrated in the part (c) of FIG. 5, the present disclosure may not be limited thereto.

[Method 8 for Orthogonal Sequence (OCC) and Cyclic Shift]

This is the case in which a normal CP is used, and three symbols out of 14 symbols in a single subframe are determined as symbols through which a DM-RS is transmitted.

Also, this is the case in which an extended CP is used, and three symbols out of 12 symbols in a single subframe are determined as symbols through which a DM-RS is transmitted.

To this end, one out of two schemes may be selected and used, the schemes including a scheme (scheme #1) that transmits a DM-RS through two existing symbols in a single subframe in the same manner as D2D (ProSe), through a higher layer signaling such as RRC or the like, and a scheme (scheme #2) that transmits a DM-RS through a total of three symbols in the single subframe.

TABLE 18

| Parameter | | PSBCH |
|---|---|---|
| Cyclic shift | $n_{cs, \lambda}$ | $\lfloor N_{ID}^{SL}/2 \rfloor \bmod 8$ |
| Orthogonal sequence | $[w^\lambda(0) \; w^\lambda(1) \; w^\lambda(2)]$ | $[+1 \; +1 \; +1]$ if $N_{ID}^{SL} \bmod 3 = 0$ |
| | | $[+1 \; e^{j2\pi/3} \; e^{j4\pi/3}]$ if $N_{ID}^{SL} \bmod 3 = 1$ |
| | | $[+1 \; e^{j4\pi/3} \; e^{j2\pi/3}]$ if $N_{ID}^{SL} \bmod 3 = 2$ |

As shown in Table 18, $[+1 \; +1 \; +1]$, $[+1 \; e^{j2\pi/3} \; e^{j4\pi/3}]$ and $[+1 \; e^{j4\pi/3} \; e^{j2\pi/3}]$ may be used as three types of length 3 OCCs by taking into consideration the DM-RS transmission of a DM-RS that links with a PSBCH through a total of 3 symbols in a single subframe.

Each of the three length 3OCCs, that is, $[+1 \; +1 \; +1]$, $[+1 \; e^{j2\pi/3} \; e^{j4\pi/3}]$, and $[+1 \; e^{j4\pi/3} \; e^{j2\pi/3}]$ may be used respectively for the cases having remainders of 0, 1, and 2 that are obtained by dividing $n_{ID}^{SL}$ by 3 in the case of a DM-RS that links with a PSBCH.

Further, in association with a cyclic shift, the configuration that is the same as the configuration in D2D (ProSe) may be possible.

[Method 9 for Orthogonal Sequence (OCC) and Cyclic Shift]

This is the case in which a normal CP is used, and three symbols out of 14 symbols in a single subframe are determined as symbols through which a DM-RS is transmitted.

Also, this is the case in which an extended CP is used, and three symbols out of 12 symbols in a single subframe are determined as symbols through which a DM-RS is transmitted.

To this end, one out of two schemes may be selected and used, the schemes including a scheme (scheme #1) that transmits a DM-RS through two existing symbols in a single subframe in the same manner as D2D (ProSe), through a higher layer signaling such as RRC or the like, and a scheme (scheme #2) that transmits a DM-RS through a total of three symbols in the single subframe.

TABLE 19

| Parameter | | PSBCH |
|---|---|---|
| Cyclic shift | $n_{cs, \lambda}$ | $\lfloor N_{ID}^{SL}/3 \rfloor \bmod 8$ |
| Orthogonal | $[w^\lambda(0) \; w^\lambda(1) \; w^\lambda(2)]$ | $[+1 \; +1 \; +1]$ if $N_{ID}^{SL} \bmod 3 = 0$ |

TABLE 19-continued

| Parameter | PSBCH |
|---|---|
| sequence | $[+1 \; e^{j2\pi/3} \; e^{j4\pi/3}]$ if $N_{ID}^{SL} \bmod 3 = 1$ |
| | $[+1 \; e^{j4\pi/3} \; e^{j2\pi/3}]$ if $N_{ID}^{SL} \bmod 3 = 2$ |

As shown in Table 19, $[+1 \; +1 \; +1]$, $[+1 \; e^{j2\pi/3} \; e^{j4\pi/3}]$, and $[+1 \; e^{j4\pi/3} \; e^{j2\pi/3}]$ may be used as three types of length 3 OCCs by taking into consideration the DM-RS transmission of a DM-RS that links with a PSBCH through a total of 3 symbols in a single subframe.

Each of the three length 3OCCs, that is, $[+1 \; +1 \; +1]$, $[+1 \; e^{j2\pi/3} \; e^{j4\pi/3}]$, and $[+1 \; e^{j4\pi/3} \; e^{j2\pi/3}]$ may be used respectively for the cases having remainders of 0, 1, and 2 that are obtained by dividing $n_{ID}^{SL}$ by 3 in the case of a DM-RS that links with a PSBCH.

Further, in association with a cyclic shift, in the case of a DM-RS that links with a PSBCH in D2D (ProSe), one out of 8 cyclic shift values is determined by executing modulo8 (mod 8) on a value obtained by dividing $n_{ID}^{SL}$ by 2, whereas, in the case of a DM-RS that links with a PSBCH in V2X, one out of 8 cyclic shift values is determined by executing modulo8 (mod 8) on a value obtained by dividing $n_{ID}^{SL}$ by 3. Further, in the case of a DM-RS that links with a PSBCH in D2D (ProSe), one out of 30 sequence shift patterns $f_{ss}$ in group hopping is determined by executing modulo30 (mod 30) on a value obtained by dividing $n_{ID}^{SL}$ by 16, whereas, in the case of a DM-RS that links with a PSBCH in V2X, one out of 30 sequence shift patterns $f_{ss}$ in group hopping is determined by executing modulo 30 (mod 30) on a value obtained by dividing $n_{ID}^{SL}$ by 24.

Here, each embodiment may be applied differently to each channel (PSCCH, PSSCH, PSDCH, and PSBCH) that links with a DM-RS. For example, in the case of a DM-RS that links with a PSCCH and a PSSCH, one of Method 4 for an orthogonal sequence (OCC) and a cyclic shift, Method 5 for an orthogonal sequence (OCC) and a cyclic shift, and Method 6 for an orthogonal sequence (OCC) and a cyclic shift may be used. However, in the case of a DM-RS that links with a PSBCH, one of Method 7 for an orthogonal sequence (OCC) and a cyclic shift, Method 8 for an orthogonal sequence (OCC) and a cyclic shift, and Method 9 for an orthogonal sequence (OCC) and a cyclic shift may be used.

In addition, $n_{CS,\lambda}$ is determined to be one out of a total of eight values which are determined through Table 6 to Table 19. In this instance, only 0, $\pi/6$, $\pi/3$, $\pi/2$, $4\pi/6$, $5\pi/6$, $\pi$, and $7\pi/6$ are used based on $\alpha_\lambda = 2\pi n_{cs,\lambda}/12$ and thus, the value is not equally allocated with respect to 360 degrees, which is a drawback. Therefore, through Table 20 or 21, one out of a total of 8 cyclic shift values which are determined through Table 6 to Table 19 may indicate $n^{(1)}_{DMRS}$ or $n^{(2)}_{DMRS,\lambda}$ in Equation 5 below, as opposed to indicating $n_{CS,\lambda}$. That is, when a total of 8 cyclic shifts determined through Table 6 to Table 19 are 0, 1, 2, 3, 4, 5, 6, and 7, respectively, this indicates that $n_{CS,\lambda}$ value is 0, 1, 2, 3, 4, 5, 6, and 7, respectively. According to Table 20 in the present disclosure, when a total of 8 cyclic shifts determined through Table 6 to Table 19 are 0, 1, 2, 3, 4, 5, 6, and 7, respectively, this indicates that $n^{(1)}_{DMRS}$ value is 0, 2, 3, 4, 6, 8, 9, and 10, respectively. According to Table 21 in the present disclosure, when a total of 8 cyclic shifts determined through Table 6 to Table 19 are 0, 1, 2, 3, 4, 5, 6, and 7, respectively, this indicates that $n^{(2)}_{DMRS,\lambda}$ value is 0, 6, 3, 4, 2, 8, 10, and 9, respectively.

$$n_{cs,\lambda} = (n_{DMRS}^{(1)} + n_{DMRS,\lambda}^{(2)} + n_{PN}(n_s)) \bmod 12 \qquad \text{[Equation 5]}$$

TABLE 20

| cyclic Shift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

TABLE 21

| cyclic Shift | $n_{DMRS,\lambda}^{(2)}$ |
|---|---|
| 0 (000) | 0 |
| 1 (001) | 6 |
| 2 (010) | 3 |
| 3 (011) | 4 |
| 4 (100) | 2 |
| 5 (101) | 8 |
| 6 (110) | 10 |
| 7 (111) | 9 |

Here, the following cases are possible with respect to $n_{CS,\lambda}$ that is determined by adding three values, that is, $n_{DMRS}^{(1)}$, $n_{DMRS,\lambda}^{(2)}$, and $n_{PN}$, as shown in Equation 5, and executing modulo12 (mod 12) on the sum.

1) the case #1 in which a total of 8 cyclic shifts determined through Table 6 to Table 19 indicate $n_{DMRS}^{(1)}$
   determine $n_{DMRS}^{(1)}$ based on Table 20
   $n_{DMRS,\lambda}^{(2)}=0$
   $n_{PN}=0$
2) the case #1 in which a total of 8 cyclic shifts determined through Table 6 to Table 19 indicate $n_{DMRS,\lambda}^{(2)}$
   $n_{DMRS}^{(1)}=0$
   determine $n_{DMRS,\lambda}^{(2)}$ based on Table 21
   $n_{PN}=0$
3) the case #1 in which a total of 8 cyclic shifts determined through Table 6 to Table 19 indicate $n_{DMRS}^{(1)}$ and $n_{DMRS,\lambda}^{(2)}$
   determine $n_{DMRS}^{(1)}$ based on Table 20
   determine $n_{DMRS,\lambda}^{(2)}$ based on Table 21
   $n_{PN}=0$
4) the case #2 in which a total of 8 cyclic shifts determined through Table 6 to Table 19 indicate $n_{DMRS}^{(1)}$
   determine $n_{DMRS}^{(1)}$ based on Table 20
   $n_{DMRS,\lambda}^{(2)}=0$
   $n_{PN}$ is generated to be different for each DM-RS transmission symbol
5) the case #2 in which a total of 8 cyclic shifts determined through Table 6 to Table 19 indicate $n_{DMRS,\lambda}^{(2)}$
   $n_{DMRS}^{(1)}=0$
   determine $n_{DMRS,\lambda}^{(2)}$ based on Table 21
   $n_{PN}$ is generated to be different for each DM-RS transmission symbol
6) the case #2 in which a total of 8 cyclic shifts determined through Table 6 to Table 19 indicate $n_{DMRS}^{(1)}$ and $n_{DMRS,\lambda}^{(2)}$
   determine $n_{DMRS}^{(1)}$ based on Table 20
   determine $n_{DMRS,\lambda}^{(2)}$ based on Table 21
   $n_{PN}$ is generated to be different for each DM-RS transmission symbol Among the above described cases, the case that generates $n_{PN}$ to be different for each DM-RS transmission symbol is to avoid an identical DM-RS that is transmitted by a terminal in a single subframe (or transmission time interval (TTI)) by taking into consideration the environment where a terminal has a very quick movement speed. Methods to achieve the above will be described as follows.

Hereinafter, method 1 for generating $n_{PN}$ to be different for each DM-RS transmission symbol is defined.

According to method 1, as shown in Equation 6 below, by taking into consideration the case in which a DM-RS is generated in two symbols in a single slot which corresponds to the part (a) of FIG. 5 or the part (b) of FIG. 5, two different $n_{PN}$ values are defined in each slot, irrespective of the locations of the two symbols. One $n_{PN}$ value is applied to a first symbol through which a DM-RS is transmitted in the slot, and the other $n_{PN}$ value is applied to a second symbol through which the DM-RS is transmitted in the slot. In this instance, l'=0 or 1.

$$n_{PN}(n_s)=\Sigma_{i=0}^{7}c(16n_{ss}^{PSSCH}+8l'+i)\cdot 2^i \qquad \text{[Equation 6]}$$

Here, c(i) denotes a pseudo-random sequence defined as Gold sequence having a degree of 31.

A pseudo-random sequence generator for the pseudo-random sequence is initialized to $$c_{init} = \left\lfloor \frac{n_{ID}^{SA}}{30} \right\rfloor \cdot 2^5 + (n_{ID}^{SA} \bmod 30)$$

at the beginning of each slot that satisfies $n_{ss}^{PSSCH}=0$.

In this instance, $n_{ss}^{PSSCH}$ denotes a current slot number in the subframe pool for a sidelink. Here, $n_{ID}^{SA}$ may be a sidelink group destination identity.

Hereinafter, method 2 for generating $n_{PN}$ to be different for each DM-RS transmission symbol is defined.

According to method 2, as shown in Equation 7 below, by taking into consideration the case in which a DM-RS is generated in three symbols in a single subframe which corresponds to the part (c) of FIG. 5, three different $n_{PN}$ values are defined in each subframe, irrespective of the locations of the three symbols. A first $n_{PN}$ value is applied to a first symbol through which a DM-RS is transmitted in the subframe, a second $n_{PN}$ value is applied to a second symbol through which the DM-RS is transmitted in the subframe, and a third $n_{PN}$ value is applied to a third symbol through which the DM-RS is transmitted in the subframe. In this instance, l'=0, 1, or 2.

$$n_{PN}(n_s)=\Sigma_{i=0}^{7}c(8l'+i)\cdot 2^i \qquad \text{[Equation 7]}$$

Also, c(i) denotes a pseudo-random sequence defined as Gold sequence having a degree of 31.

The pseudo-random sequence generator for the pseudo-random sequence is initialized to $$c_{init} = \left\lfloor \frac{N_{ID}^{SL}}{30} \right\rfloor \cdot 2^5 + (N_{ID}^{SL} \bmod 30) \text{ or } c_{init} = \left\lfloor \frac{\lfloor N_{ID}^{SL}/24 \rfloor}{30} \right\rfloor \cdot 2^5 + (\lfloor N_{ID}^{SL}/24 \rfloor \bmod 30),$$

at the beginning of each PSBCH subframe (a subframe that transmits a PSBCH).

Here, $N_{ID}^{SL}$ may be a physical layer sidelink synchronization identity.

Hereinafter, method 3 for generating $n_{PN}$ to be different for each DM-RS transmission symbol is defined.

Method 3 defines a different $n_{PN}$ value for each of the symbols in a single slot, and a corresponding symbol through which a DM-RS is transmitted applies a corresponding $n_{PN}$ value of the symbol, as shown in Equation 8 below. This may be applied to all of the cases illustrated through FIGS. 5A, 5B, and 5C. In this instance, $N^{SL}_{symb}$ denotes the number of symbols in a single slot in a sidelink (SL) (7 in the case of a normal CP, and 6 in the case of an extended CP), and $l=0, 1, \ldots, N^{SL}_{symb}$ denotes a symbol index in a single slot.

$$n_{PN}(n_s) = \Sigma_{i=0}^{7} c(8 \cdot N_{symb}^{SL} \cdot n_s + 8l + i) \cdot 2^i \quad \text{[Equation 8]}$$

In Equation 8, $n_s$ is $n^{PSSCH}_{ss}$ when the equation is applied to a DM-RS for a PSSCH.

However, in Equation 8, $n_s$ may have two values, that is, 0 or 1, when the equation is applied to a DM-RS for a PSBCH.

Also, c(i) denotes a pseudo-random sequence defined as Gold sequence having a degree of 31.

When Equation 8 is applied to the DM-RS for the PSSCH, the pseudo-random sequence generator for the pseudo-random sequence may be initialized to $$c_{init} = \left\lfloor \frac{n_{ID}^{SA}}{30} \right\rfloor \cdot 2^5 + (n_{ID}^{SA} \bmod 30)$$

at the beginning of each slot that satisfies $n^{PSSCH}_{ss}=0$.

When Equation 8 is applied to the DM-RS for the PSCBCH, the pseudo-random sequence generator for the pseudo-random sequence may be initialized to $$c_{init} =$$
$$\left\lfloor \frac{N_{ID}^{SL}}{30} \right\rfloor \cdot 2^5 + (N_{ID}^{SL} \bmod 30) \text{ or } c_{init} = \left\lfloor \frac{\lfloor N_{ID}^{SL}/24 \rfloor}{30} \right\rfloor \cdot 2^5 + (\lfloor N_{ID}^{SL}/24 \rfloor \bmod 30)$$

at the beginning of every PSBCH subframe (a subframe that transmits a PSBCH).

In this instance, $n^{PSSCH}_{ss}$ denotes a current slot number in the subframe pool for a sidelink. Here, $n^{SA}_{ID}$ is a sidelink group destination identity, and $N^{SL}_{ID}$ is a physical layer sidelink synchronization identity.

Figure 6:
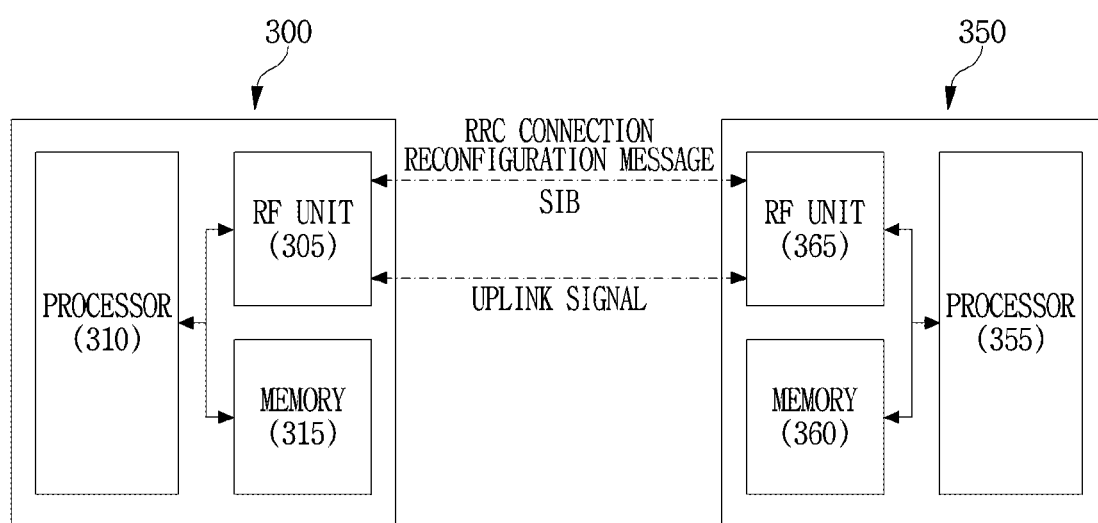
FIG. 6 is a block diagram illustrating a wireless communication system where embodiments of the present disclosure are implemented.

FIG. 6 is a block diagram illustrating a wireless communication system according to an embodiment of the present invention.

Referring to FIG. 6, the UE 300 includes a processor 310, a radio frequency (RF) module 305 and a memory 315. The memory 315 is connected to the processor 310 and stores various pieces of information to drive the processor 310. The RF module 305 is connected to the processor 310 and transmits and/or receives a radio signal. For example, the RF module 305 receives an upper-layer message, such as a RRC (connection reconfiguration) message, and a SIB message from the BS 350. Also the RF module 305 transmits an uplink signal according to an embodiment of the present invention. The processor 310 implements functions, processes and/or methods of the UE suggested in FIGS. 2 to 5 in the present specification. The memory 315 may store with various values calculated by using equations and tables, and provide inputs to the processor 310 based on request of order from the processor 310.

The BS 350 includes a processor 355, a Radio Frequency (RF) module 365, and a memory 360. The memory 360 is connected to the processor 355, and stores various pieces of information for driving the processor 355. The RF module 365 is connected with the processor 355, and transmits and/or receives a wireless signal. The processor 355 implements functions, processes and/or methods of the BS suggested in FIGS. 2 to 5 in the present specification.

Exemplary embodiments of the present invention may be implemented by hardware, software or a combination thereof. In a hardware configuration, the above-described functions and operations may be performed by one or more processors, such as a microprocessor, a controller, a micro-controller, or an ASIC (Application Specific Integrated Circuit), a DSP (Digital Signal Processor), a PLD (Programmable logic device), a FPGA (Field Programmable Gate Array), and/or combinations thereof configured to perform the functions and operations. In a software configuration, software or program codes to perform the functions and operations may be implemented as modules. Software may be stored in one or more memory units and may be executed by the one or more processors. It will be apparent to those of ordinary skill in the art from the description of the present invention to design, develop and implement the memory units or the processors.

A processor according to an embodiment of the present disclosure may determine group hopping, an orthogonal sequence (OCC), and a cyclic shift value based on the methods described through Table 6 to Table 19.

Also, in the case of a cyclic shift $n_{CS,\lambda}$ value in Table 6 to Table 19, the processor may execute a control so that at least one out of $n^{(1)}_{DMRS}$ or $n^{(2)}_{DMRS,\lambda}$ in Equation 5 is indicated through Table 20 or Table 21 as opposed to applying the methods described through Table 6 to Table 19 as they are, by taking into consideration a drawback in that only 0, $\pi/6$, $\pi/3$, $\pi/2$, $4\pi/6$, $5\pi/6$, $\pi$, and $7\pi/6$ are used based on $\alpha_\lambda = 2\pi n_{cs,\lambda}/12$ and the value is not equally allocated with respect to 360 degrees.

According to one or more exemplary embodiments, an apparatus and method for transmitting Demodulation-Reference Signal (DM-RS) configured for Vehicle-to-everything (V2X) communication are provided. An apparatus may be equipped in a vehicle, such as a car, motorcycle, and the like. However, the apparatus may be equipped in other devices configured for a V2X communication.

The apparatus may include a processor, a memory, and a wireless transceiver including an RF module and an antenna. The processor may generate a first DM-RS for V2X communication and a second DM-RS for V2X communication, the first DM-RS for V2X communication being mapped in a first symbol in a first slot of a subframe, the second DM-RS for V2X communication being mapped in a second symbol in the first slot of the subframe, and generate a third DM-RS for V2X communication and a fourth DM-RS for V2X communication, the third DM-RS for V2X communication being mapped in a first symbol in a second slot of the subframe, the fourth DM-RS for V2X communication being mapped in a second symbol in the second slot of the subframe. The mapping processes may be performed by the processor.

The processor may control a wireless transceiver to transmit the first DM-RS for V2X communication, the second DM-RS for V2X communication, the third DM-RS for V2X communication, and the fourth DM-RS for V2X communication to another device through a V2X communication. If a group-hopping is enabled, the first DM-RS for V2X communication may be generated based on a first group-hopping and the second DM-RS for V2X communication may be generated based on a second group-hopping.

The first group-hopping may be associated with a first equation, $(\Sigma_{i=0}^{7} c(16 n_{ss}^{PSSCH}+i) \cdot 2^i) \bmod 30$, and the second group-hopping may be associated with a second equation, $(\Sigma_{i=0}^{7} c(16 n_{ss}^{PSSCH}+8+i) \cdot 2^i) \bmod 30$. Here, c(x) for the first equation and the second equation denotes a pseudo-random sequence that is defined as a length-31 Gold sequence and $n_{ss}^{PSSCH}$ denotes a current slot number in a subframe pool for a sidelink. $n_{ss}^{PSSCH}=k$ for the first slot of the subframe and $n_{ss}^{PSSCH}=k+1$ for the second slot of the subframe, where k is a non-negative integer. The number k may be one of 0, 2, 4, . . . , 18 of ten subframes arranged in the subframe pool.

The processor may apply first orthogonal sequence [+1 +1 +1 +1] or second orthogonal sequence [+1 −1 +1 −1] in association with the first, second, third, and fourth DM-RSs for V2X communication. The first orthogonal sequence [+1 +1 +1 +1] may be configured to be applied when a modulo-2 operation of an identifier is equal to zero, and the second orthogonal sequence [+1 −1 +1 −1] may be configured to be applied when the modulo-2 operation of the identifier is equal to one.

According to one or more exemplary embodiments, each of the first slot and the second slot consists of seven symbols, respectively (normal cyclic prefix). As shown in the part (b) of FIG. 5, when the first slot precedes the second slot in a time axis, the first symbol in the first slot is symbol #2 and the second symbol in the first slot is symbol #5 if the seven symbols in the first slot are arranged from symbol #0 to symbol #6, and the first symbol in the second slot is symbol #1 and the second symbol in the second slot is symbol #4 if the seven symbols in the second slot are arranged from symbol #0 to symbol #6.

According to one or more exemplary embodiments, an apparatus and method for receiving Demodulation-Reference Signal (DM-RS) configured for Vehicle-to-everything (V2X) communication are provided. An apparatus may be equipped in a vehicle, such as a car, motorcycle, and the like. However, the apparatus may be equipped in other devices configured for a V2X communication.

The apparatus may include a processor, a memory, and a wireless transceiver including an RF module and an antenna. The processor may receive and decode a first DM-RS for V2X communication and a second DM-RS for V2X communication, the first DM-RS for V2X communication being mapped in a first symbol in a first slot of a subframe, the second DM-RS for V2X communication being mapped in a second symbol in the first slot of the subframe, and receive and decode a third DM-RS for V2X communication and a fourth DM-RS for V2X communication, the third DM-RS for V2X communication being mapped in a first symbol in a second slot of the subframe, the fourth DM-RS for V2X communication being mapped in a second symbol in the second slot of the subframe.

The processor may generate a first DM-RS for comparison, a second DM-RS for comparison, a third DM-RS for comparison, and a fourth DM-RS for comparison. The generation may be performed based on the equations described above. The processor may compare the first DM-RS for V2X communication with the first DM-RS for comparison, compare the second DM-RS for V2X communication with the second DM-RS for comparison, compare the third DM-RS for V2X communication with the third DM-RS for comparison, and compare the fourth DM-RS for V2X communication with the fourth DM-RS for comparison. The first DM-RS for comparison may be generated based on the first group-hopping, and the second DM-RS for comparison may be generated based on the second group-hopping.

While the present invention has been shown and described in connection with the embodiments, it will be apparent to those skilled in the art that modifications and variations can be made without departing from the spirit and scope of the invention as defined by the appended claims. Thus, the present invention is not limited to the foregoing embodiments and may include all the embodiments within the scope of the appended claims. For example, various exemplary embodiments have been described with respect to 3GPP LTE or LTE-A systems; however, aspects of the illustrated embodiments may be applied to other mobile communication systems.

What is claimed is:

1. A method performed by a wireless user device, the method comprising:
   mapping, based on a first group-hopping associated with a first time resource, a first demodulation-reference signal (DM-RS) in a first symbol in the first time resource;
   mapping, based on a second group-hopping associated with the first time resource and with an offset, a second DM-RS in a second symbol in the first time resource, wherein the first group-hopping and the second group-hopping apply different inputs in a pseudo-random sequence;
   mapping, based on a third group-hopping associated with a second time resource, a third DM-RS in a third symbol in the second time resource;
   mapping, based on a fourth group-hopping associated with the second time resource and with an offset, a fourth DM-RS in a fourth symbol in the second time resource, wherein the third group-hopping and the fourth group-hopping apply different inputs in the pseudo-random sequence; and
   transmitting, to a second wireless user device, the first DM-RS, the second DM-RS, the third DM-RS, and the fourth DM-RS.

2. The method of claim 1, wherein the first group-hopping and the third group-hopping are associated with $(\Sigma_{i=0}^{7} c(16 n_{ss}^{PSSCH}+i) \cdot 2^i) \mod 30$, and
   wherein the second group-hopping and the fourth group-hopping are associated with $(\Sigma_{i=0}^{7} c(16 n_{ss}^{PSSCH}+8+i) \cdot 2^i) \mod 30$,
   where c(x) denotes the pseudo-random sequence that is defined as a length-31 Gold sequence and $n_{ss}^{PSSCH}$ denotes a current slot number in a subframe pool for sidelink, wherein the first time resource is a first slot of a subframe, and wherein the second time resource is a second slot of the subframe.

3. The method of claim 2, wherein $n_{ss}^{PSSCH}=k$ for the first slot of the subframe and $n_{ss}^{PSSCH}=k+1$ for the second slot of the subframe, where k is a non-negative integer.

4. The method of claim 1, wherein the transmitting the first DM-RS, the second DM-RS, the third DM-RS, and the fourth DM-RS comprises:
   transmitting, using first orthogonal sequence [+1 +1 +1 +1] or second orthogonal sequence [+1 −1 +1 −1], the first DM-RS, the second DM-RS, the third DM-RS, and the fourth DM-RS.

5. The method of claim 4, further comprising:
   determining, based on a modulo-2 operation of an identifier being equal to a first value, the first orthogonal sequence [+1 +1 +1 +1]; or
   determining, based on a modulo-2 operation of the identifier being equal to a second value, the second orthogonal sequence [+1 −1 +1 −1].

6. The method of claim 1, further comprising:
   transmitting, to the second wireless user device, one or more physical sidelink shared channel (PSSCH) signals, wherein the first DM-RS, the second DM-RS, the third DM-RS, and the fourth DM-RS are associated with the one or more PSSCH signals.

7. The method of claim 1, further comprising:
enabling a group-hopping for demodulation-reference signals (DM-RSs) associated with a physical sidelink shared channel (PSSCH).

8. The method of claim 1,
wherein each of the first time resource and the second time resource consists of seven symbols, respectively,
wherein the first time resource precedes the second time resource in a time axis,
wherein the first symbol in the first time resource is symbol #2 and the second symbol in the first time resource is symbol #5, the seven symbols in the first time resource being arranged from symbol #0 to symbol #6, and
wherein the third symbol in the second time resource is symbol #1 and the fourth symbol in the second time resource is symbol #4, the seven symbols in the second time resource being arranged from symbol #0 to symbol #6.

9. A wireless user device comprising:
one or more antennas;
one or more processors; and
memory storing instructions that, when executed by the one or more processors, cause the wireless user device to:
map, based on a first group-hopping associated with a first time resource, a first demodulation-reference signal (DM-RS) in a first symbol in the first time resource;
map, based on a second group-hopping associated with the first time resource and with an offset, a second DM-RS in a second symbol in the first time resource, wherein the first group-hopping and the second group-hopping apply different inputs in a pseudo-random sequence;
map, based on a third group-hopping associated with a second time resource, a third DM-RS in a third symbol in the second time resource;
map, based on a fourth group-hopping associated with the second time resource and with an offset, a fourth DM-RS in a fourth symbol in the second time resource, wherein the third group-hopping and the fourth group-hopping apply different inputs in the pseudo-random sequence; and
transmit, to a second wireless user device, the first DM-RS, the second DM-RS, the third DM-RS, and the fourth DM-RS.

10. The wireless user device of claim 9, wherein the first group-hopping and the third group-hopping are associated with $(\Sigma_{i=0}^{7} c(16 n_{ss}^{PSSCH}+i) \cdot 2^i) \mod 30$, and
wherein the second group-hopping and the fourth group-hopping are associated with $(\Sigma_{i=0}^{7} c(16 n_{ss}^{PSSCH}+8+i) \cdot 2^i) \mod 30$,
where c(x) denotes the pseudo-random sequence that is defined as a length-31 Gold sequence and $n_{ss}^{PSSCH}$ denotes a current slot number in a subframe pool for sidelink, wherein the first time resource is a first slot of a subframe, and wherein the second time resource is a second slot of the subframe.

11. The wireless user device of claim 10, wherein $n_{ss}^{PSSCH}=k$ for the first slot of the subframe and $n_{ss}^{PSSCH}=k+1$ for the second slot of the subframe, where k is a non-negative integer.

12. The wireless user device of claim 9, wherein the instructions, when executed by the one or more processors, cause the wireless user device to:
transmit, using first orthogonal sequence [+1 +1 +1 +1] or second orthogonal sequence [+1 −1 +1 −1], the first DM-RS, the second DM-RS, the third DM-RS, and the fourth DM-RS.

13. The wireless user device of claim 12, wherein the instructions, when executed by the one or more processors, cause the wireless user device to:
determine, based on a modulo-2 operation of an identifier being equal to a first value, the first orthogonal sequence [+1 +1 +1 +1]; or
determine, based on a modulo-2 operation of the identifier being equal to a second value, the second orthogonal sequence [+1 −1 +1 −1].

14. The wireless user device of claim 9, wherein the instructions, when executed by the one or more processors, cause the wireless user device to:
transmit, to the second wireless user device, one or more physical sidelink shared channel (PSSCH) signals,
wherein the first DM-RS, the second DM-RS, the third DM-RS, and the fourth DM-RS are associated with the one or more PSSCH signals.

15. The wireless user device of claim 9, wherein the instructions, when executed by the one or more processors, cause the wireless user device to:
enable a group-hopping for demodulation-reference signals (DM-RSs) associated with a physical sidelink shared channel (PSSCH).

16. The wireless user device of claim 9,
wherein each of the first time resource and the second time resource consists of seven symbols, respectively,
wherein the first time resource precedes the second time resource in a time axis,
wherein the first symbol in the first time resource is symbol #2 and the second symbol in the first time resource is symbol #5, the seven symbols in the first time resource being arranged from symbol #0 to symbol #6, and
wherein the third symbol in the second time resource is symbol #1 and the fourth symbol in the second time resource is symbol #4, the seven symbols in the second time resource being arranged from symbol #0 to symbol #6.

17. A non-transitory computer-readable medium storing instructions that, when executed by one or more processors, cause a wireless user device to:
map, based on a first group-hopping associated with a first time resource, a first demodulation-reference signal (DM-RS) in a first symbol in the first time resource;
map, based on a second group-hopping associated with the first time resource and with an offset, a second DM-RS in a second symbol in the first time resource, wherein the first group-hopping and the second group-hopping apply different inputs in a pseudo-random sequence;
map, based on a third group-hopping associated with a second time resource, a third DM-RS in a third symbol in the second time resource;
map, based on a fourth group-hopping associated with the second time resource and with an offset, a fourth DM-RS in a fourth symbol in the second time resource, wherein the third group-hopping and the fourth group-hopping apply different inputs in the pseudo-random sequence; and transmit, to a second wireless user device, the first DM-RS, the second DM-RS, the third DM-RS, and the fourth DM-RS.

18. The non-transitory computer-readable medium of claim 17, wherein the first group-hopping and the third group-hopping are associated with $(\Sigma_{i=0}^{7} c(16 n_{ss}^{PSSCH}+i) \cdot 2^i)$ mod 30, and wherein the second group-hopping and the fourth group-hopping are associated with $(\Sigma_{i=0}^{7} c(16 n_{ss}^{PSSCH}+8+i) \cdot 2^i)$ mod 30, where $c(x)$ denotes the pseudo-random sequence that is defined as a length-31 Gold sequence and $n_{ss}^{PSSCH}$ denotes a current slot number in a subframe pool for sidelink, wherein the first time resource is a first slot of a subframe, and wherein the second time resource is a second slot of the subframe.

19. The non-transitory computer-readable medium of claim 18, wherein $n_{ss}^{PSSCH}=k$ for the first slot of the subframe and $n_{ss}^{PSSCH}=k+1$ for the second slot of the subframe, where k is a non-negative integer.

20. The non-transitory computer-readable medium of claim 17, wherein the instructions, when executed by the one or more processors, cause the wireless user device to:

transmit, using first orthogonal sequence [+1 +1 +1 +1] or second orthogonal sequence [+1 −1 +1 −1], the first DM-RS, the second DM-RS, the third DM-RS, and the fourth DM-RS.

21. The non-transitory computer-readable medium of claim 20, wherein the instructions, when executed by the one or more processors, cause the wireless user device to:

determine, based on a modulo-2 operation of an identifier being equal to a first value, the first orthogonal sequence [+1 +1 +1 +1]; or determine, based on a modulo-2 operation of the identifier being equal to a second value, the second orthogonal sequence [+1 −1 +1 −1].

22. The non-transitory computer-readable medium of claim 17, wherein the instructions, when executed by the one or more processors, cause the wireless user device to:

transmit, to the second wireless user device, one or more physical sidelink shared channel (PSSCH) signals, wherein the first DM-RS, the second DM-RS, the third DM-RS, and the fourth DM-RS are associated with the one or more PSSCH signals.

23. The non-transitory computer-readable medium of claim 17, wherein the instructions, when executed by the one or more processors, cause the wireless user device to:

enable a group-hopping for demodulation-reference signals (DM-RSs) associated with a physical sidelink shared channel (PSSCH).

24. The non-transitory computer-readable medium of claim 17, wherein each of the first time resource and the second time resource consists of seven symbols, respectively, wherein the first time resource precedes the second time resource in a time axis, wherein the first symbol in the first time resource is symbol #2 and the second symbol in the first time resource is symbol #5, the seven symbols in the first time resource being arranged from symbol #0 to symbol #6, and wherein the third symbol in the second time resource is symbol #1 and the fourth symbol in the second time resource is symbol #4, the seven symbols in the second time resource being arranged from symbol #0 to symbol #6.

* * * * *